(12) United States Patent
Mallinson

(10) Patent No.: US 8,791,901 B2
(45) Date of Patent: Jul. 29, 2014

(54) OBJECT TRACKING WITH PROJECTED REFERENCE PATTERNS

(75) Inventor: Dominic S Mallinson, Redwood City, CA (US)

(73) Assignee: Sony Computer Entertainment, Inc., Minato-Ku, Tokyo (JP)

( * ) Notice: Subject to any disclaimer, the term of this patent is extended or adjusted under 35 U.S.C. 154(b) by 324 days.

(21) Appl. No.: 13/084,895

(22) Filed: Apr. 12, 2011

(65) Prior Publication Data

US 2012/0262365 A1 Oct. 18, 2012

(51) Int. Cl.
*G09G 5/00* (2006.01)

(52) U.S. Cl.
USPC .......................................... 345/156

(58) Field of Classification Search
USPC .......................................... 345/156
See application file for complete search history.

(56) References Cited

U.S. PATENT DOCUMENTS

| | | | |
|---|---|---|---|
| 4,710,020 A * | 12/1987 | Maddox et al. ............... | 356/3.13 |
| 5,912,700 A | 6/1999 | Honey et al. | |
| 6,609,797 B2 | 8/2003 | Ejiri et al. | |
| 6,646,251 B1 * | 11/2003 | Okamoto ...................... | 250/221 |
| 6,952,003 B2 | 10/2005 | Skurnik et al. | |
| 7,075,661 B2 | 7/2006 | Petty et al. | |
| 7,451,633 B2 | 11/2008 | Bang et al. | |
| 7,729,515 B2 | 6/2010 | Mandella et al. | |
| 7,996,097 B2 * | 8/2011 | Dibernardo et al. ............ | 700/56 |
| 8,314,770 B2 * | 11/2012 | Deliwala ....................... | 345/158 |
| 2002/0036779 A1 | 3/2002 | Kiyoi et al. | |
| 2002/0085097 A1 | 7/2002 | Colmenarez et al. | |
| 2002/0131052 A1 | 9/2002 | Emery | |
| 2002/0131056 A1 | 9/2002 | Fujii et al. | |
| 2002/0194914 A1 | 12/2002 | Foxlin et al. | |
| 2003/0158699 A1 | 8/2003 | Townsend et al. | |
| 2003/0233870 A1 | 12/2003 | Mancevski | |
| 2004/0233461 A1 | 11/2004 | Armstrong et al. | |
| 2004/0252102 A1 * | 12/2004 | Wilson et al. ................. | 345/156 |
| 2005/0213082 A1 * | 9/2005 | DiBernardo et al. ..... | 356/139.03 |
| 2006/0033713 A1 * | 2/2006 | Pryor ............................ | 345/158 |
| 2006/0047427 A1 | 3/2006 | Weed et al. | |
| 2006/0284979 A1 | 12/2006 | Clarkson | |

(Continued)

OTHER PUBLICATIONS

International Search Report and Written Opinion for International Patent Application No. PCT/US2012/30478, Mailed Jul. 24, 2012, 13 pages.

(Continued)

*Primary Examiner* — Alexander S Beck
*Assistant Examiner* — Mihir Ryan
(74) *Attorney, Agent, or Firm* — Blakely, Sokoloff, Taylor & Zafman LLP

(57) ABSTRACT

Systems and methods for tracking an object's position and orientation within a room using patterns projected onto an interior surface of the room, such as the ceiling. Systems include at least one optical position sensitive device embedded in the object to detect relative changes in the projected pattern as the object's position and/or orientation is changed. In particular systems, the pattern includes a plurality of beacons projected by one or more steerable lasers. Projected beacons may be steered automatically to accommodate a variety of room topologies. Additional optical position sensitive devices may be disposed in known physical positions relative to the projected pattern to view either or both the projected pattern and the object. A subset of object positional data may be derived from a video camera viewing the object while another subset of object positional data is derived from the projected pattern.

34 Claims, 22 Drawing Sheets

(56) References Cited

U.S. PATENT DOCUMENTS

| | | |
|---|---|---|
| 2006/0287084 A1 | 12/2006 | Mao et al. |
| 2007/0276590 A1* | 11/2007 | Leonard et al. ............... 701/207 |
| 2008/0219509 A1 | 9/2008 | White et al. |
| 2009/0081923 A1* | 3/2009 | Dooley et al. ................. 446/456 |
| 2010/0013860 A1* | 1/2010 | Mandella et al. ............. 345/650 |
| 2010/0105475 A1 | 4/2010 | Mikhailov et al. |
| 2010/0150404 A1* | 6/2010 | Marks et al. .................. 382/107 |
| 2010/0194872 A1* | 8/2010 | Mathe et al. .................... 348/77 |
| 2011/0163950 A1 | 7/2011 | Ye et al. |
| 2011/0210915 A1* | 9/2011 | Shotton et al. ................ 345/157 |
| 2012/0120030 A1* | 5/2012 | McCarthy et al. ............ 345/175 |
| 2014/0031980 A1* | 1/2014 | Gutmann et al. ............. 700/253 |

OTHER PUBLICATIONS

Non-Final Office Action for U.S. Appl. No. 12/435,386, Mailed Sep. 7, 2012, 11 pages.

Final Office Action for U.S. Appl. No. 12/435,386, Mailed Jun. 14, 2013, 11 pages.

International Search Report and Written Opinion for International Patent Application No. PCT/US2010/36697, Mailed Aug. 17, 2010, 8 pages.

http://www.engadget.com/2011/03/01/tobii-and-lenovo-show-off-prototype-eye-controlled-laptop-we-go/#disqus_thread, "Tobii and Lenovo show off prototype eye-controlled laptop, we go eyes-on" by Chris Ziegler posted on Mar. 1, 2011, 5 pages.

* cited by examiner

OBJECT TRACKING WITH PROJECTED REFERENCE PATTERNS

FIELD

The present invention relates to object tracking and more particularly to determining positional information of a tracked object based on the object's perception of a projected reference pattern.

DESCRIPTION OF RELATED ART

Richer interactive experiences are possible with graphical displays which can be controlled via performance capture. Generally, performance capture refers to having an electronic device such as a computing system, video game console, smart appliance, etc. conduct a precise one to one tracking of a system user's motion and induce a corresponding effect on a displayed graphic. For example an object whose 3D movement in real world space is tracked by the system may be input to a player avatar and/or other graphical displays rendered in a game space by a graphics engine executing on a gaming platform.

A variety of techniques are now in practice to capture a system user's performance. For example, a Sony Playstation® Move employs a video camera to determine positional information for a tracked object in real world space. Regardless of the technique however, improvements in tracking rate and accuracy are beneficial to the experience with respect to the variety of movements which may be captured and the realism of the game space. For example, certain object tracking techniques may determine one component of an object's position more accurately than another component and thereby either preclude capturing certain movements altogether or suffer from significant error in approximation of a movement. Object tracking rate can also have bandwidth limitations and because tracking overhead often competes with system overhead (e.g., a game engine executing on a game console), techniques which reduce object tracking bandwidth and thereby improve object tracking performance for a given overhead are also beneficial.

BRIEF DESCRIPTION OF THE DRAWINGS

Embodiments of the invention are particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

Figure 1:
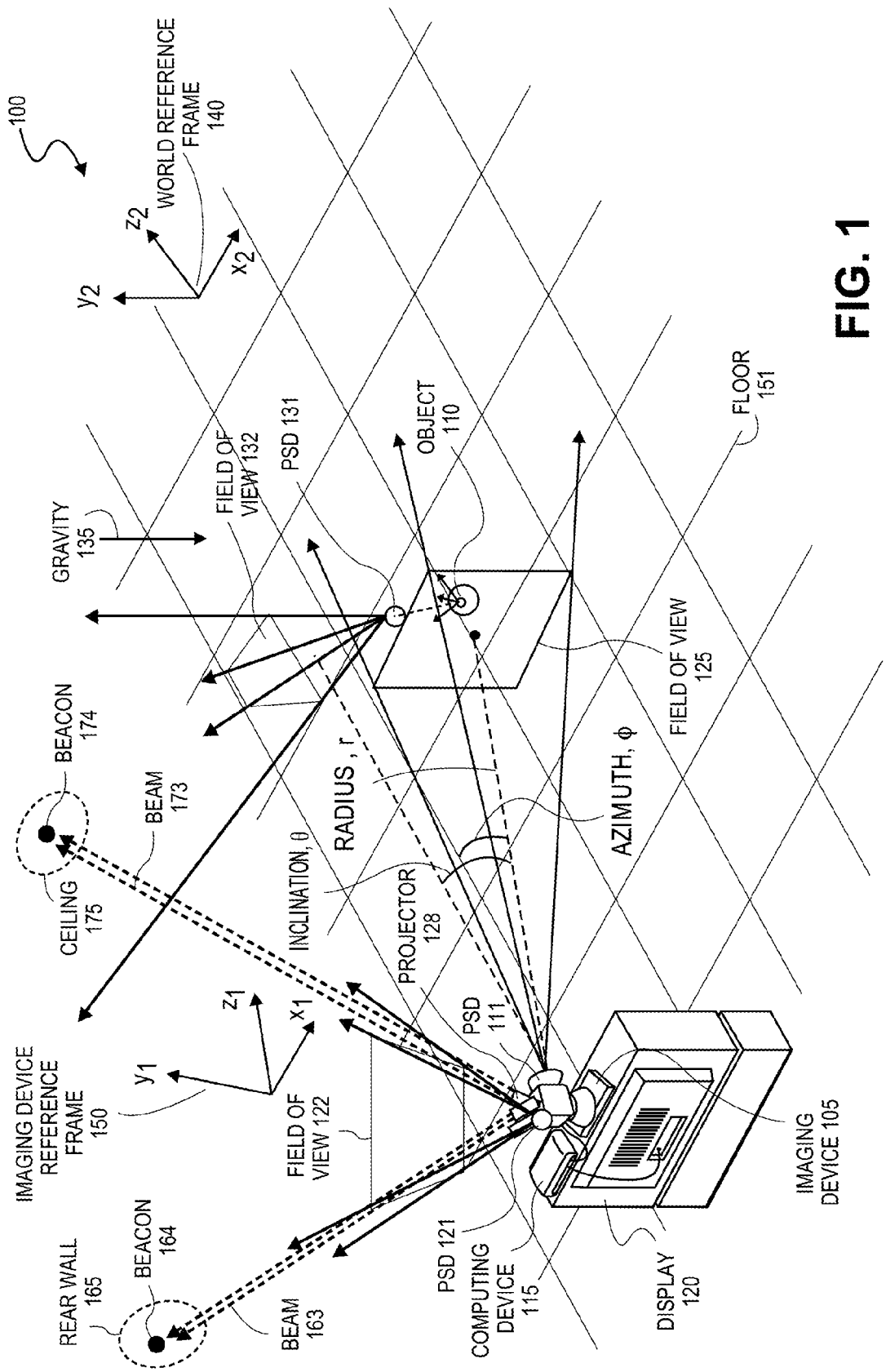
FIG. 1 illustrates an isometric view of a projection-based object tracking system, in accordance with an embodiment.

For clarity of illustration, elements illustrated in the figures have not necessarily been drawn to scale. Further, where considered appropriate, reference numerals have been repeated among the figures to indicate corresponding or analogous elements.

DETAILED DESCRIPTION

Described herein are methods and systems for determining positional information of a tracked object based at least in part on a reference pattern projected on an interior surface of a room in which the system is disposed. Systems include at least one optical position sensitive device embedded in the object to detect relative changes in the projected pattern as the object's position and/or orientation is changed. In particular systems, the pattern includes a plurality of beacons projected by one or more steerable lasers. Projected beacons may be steered automatically to accommodate a variety of room topologies and to avoid obstructions. Additional optical position sensitive devices may be disposed in known physical positions relative to the projected pattern to view either or both the projected pattern and the object. A subset of object positional data may be derived from a video camera viewing the object while another subset of object positional data is derived from the projected pattern.

While numerous specific details are set forth in order to provide a thorough understanding of embodiments of the invention, it will be understood by those skilled in the art that other embodiments may be practiced without these specific details. In other instances, well-known techniques, hardware components, and software algorithms are not described in detail so as not to obscure the present invention. Some portions of the description herein are presented in terms of algorithms and symbolic representations of operations on data bits or binary digital signals within a computer memory.

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Unless specifically stated otherwise, as apparent from the following discussions, it is appreciated that throughout the specification discussions utilizing terms such as "processing," "computing," "calculating," "determining," or the like, refer to the action and/or processes of circuitry, a computer, or similar electronic computing device, that manipulate and/or transform data represented as physical, such as electronic, quantities within registers and/or memories into other data similarly represented as physical quantities within the memories and/or registers.

A computer program may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, or any other type of non-transitory media suitable for storing electronic instructions.

The terms "coupled" and "connected," along with their derivatives, may be used herein to describe structural relationships between components of the apparatus for performing the operations herein. It should be understood that these terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, and/or that the two or more elements co-operate or communicate with each other (e.g., as in a cause an effect relationship).

FIG. 1 illustrates an isometric view of a projection-based object tracking system 100, in accordance with one embodiment in which the tracking system 100 is a component of a gaming system. Functions of the components of the tracking system 100 are generally described in further reference to FIG. 2 illustrating a method for controlling a graphical display based on object positional data determined, at least in part, from a projected reference pattern.

Figure 2:
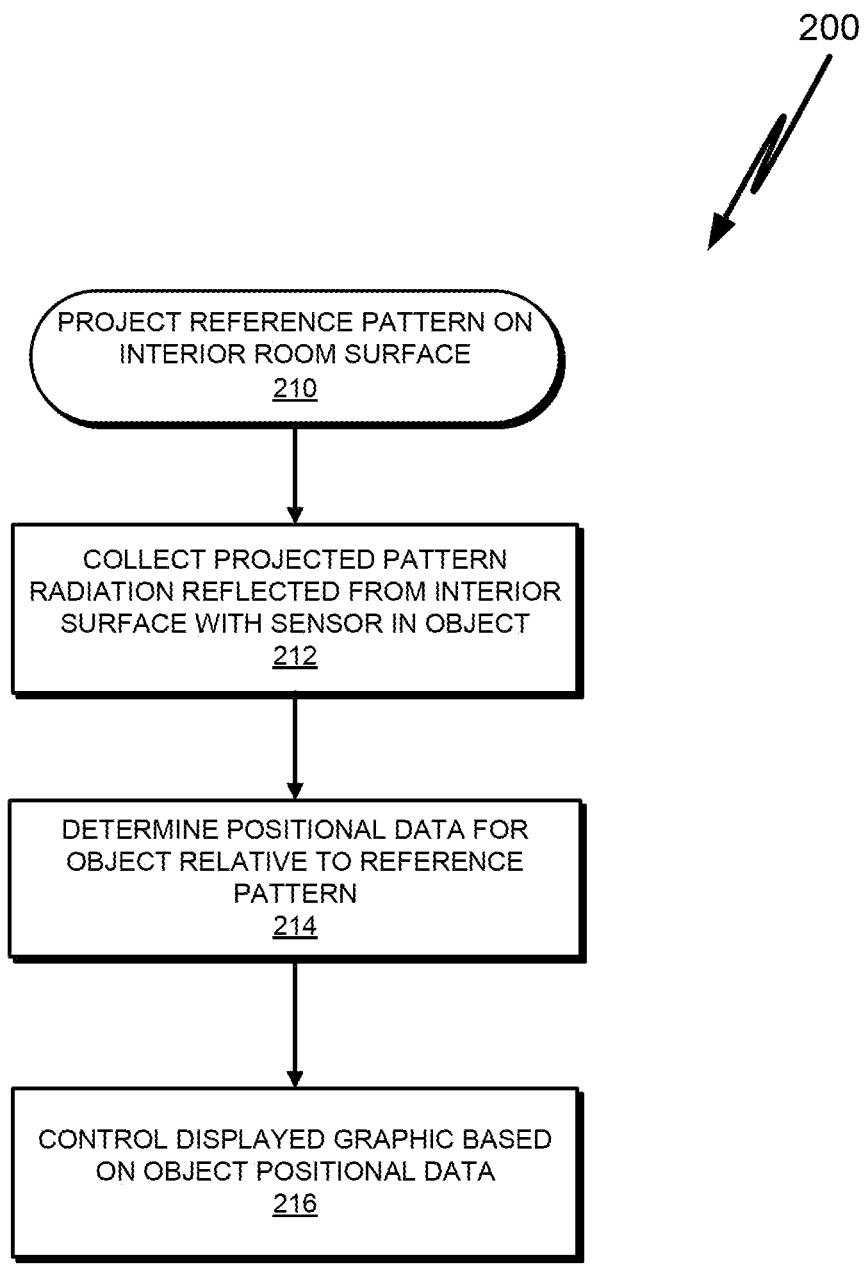
FIG. 2 illustrates a block diagram of a method for controlling a graphical display based on object positional data determined from a projected reference pattern, in accordance with an embodiment.

Referring first to FIG. 1, the tracking system 100 includes a projector 128 which is to project at reference pattern of identifiable radiation onto one or more interior surfaces of a room in which the tracking system 100 is disposed, for example as further illustrated in FIG. 2 as operation 210. FIG. 1 illustrate an exemplary projection of a beam 163 to form a beacon 164 on a rear wall surface 165 disposed behind the display 120. The projector 128 may project a plurality of such beams, for example projection of the beam 173 forms a beacon 174 on a ceiling 175 disposed above the display 120. The beacons 164 and 165 comprise at least a portion of the projected reference pattern.

The tracking system 100 further includes an object 110 that is tracked by the computing device 115. Disposed on or embedded within the object 110 is a position sensitive device (PSD) 131 having an optical field of view (FOV) 132 through which a sensor surface is to collect at least some of the identifiable radiation as reflected from the at least one interior surface, for example as further illustrated in FIG. 2 as operation 212. The PSD 131 may generally be any optical position sensor that can measure a position of an incident spot light in one or two-dimensions. In certain exemplary embodiments described in more detail elsewhere herein the PSD 131 is a video camera utilizing a highly integrated sensor technology, such as CMOS, with a megapixel or more of resolution, and capable of capturing frames of image data provided by the FOV 132. In other exemplary embodiments described in more detail elsewhere herein, the PSD 131 is a multi-element photodiode (e.g., employing a P-i-N semiconductor stack) having vastly fewer sensor elements than a contemporary CMOS image sensor. For example, in on embodiment the PSD 131 is a quadrant detector having four elements and therefore offers the advantages of reduced cost and higher refresh rate than a CMOS image sensor. From the few detector elements, measurements of an intensity distribution centroid associated with the projected reference pattern within the FOV 132 may be determined with known techniques.

As illustrated in FIG. 1, the tracking system 100 further includes a computing device 115 coupled to a display 120 which may be any conventional display (e.g. LCD, OLED, CRT, etc). The computing device 115 may be specially constructed for the required purposes, or it may comprise a general purpose computer selectively activated or reconfigured by a computer program stored in the computer. In one embodiment, computing device 115 is a game console (e.g., a Sony Playstation® or the like). The computing device 115 includes a computer processor and is at least responsible for generating output on the display 120.

In particular embodiments, the computing device 115 is to process data received from a PSD 111, as well a PSD 121 which are both remote to the object 110 and have known positions and orientations relative to the projector 128. In the exemplary embodiment, the PSD 111, PSD 121 and projector 128 are provided as integrated components of a peripheral imaging device 105 defining an imaging device reference frame 150 common to the PSDs 111, 121 and projector 128. The peripheral imaging device 105 is communicatively coupled to the computing device 115, for example through IEEE 1394 (firewire) cable, ethernet cable, a universal serial bus (USB) cable, high definition media interface (HDMI), or similar link. As shown, the imaging device 105 is positioned on top of the display 120, with a nominal inclination angle θ relative to a room floor 151 defining an angle between a horizontal axis $x_1$ of the imaging device reference frame 150 and a plane perpendicular to gravity 135, and a nominal azimuth angle φ relative to the $z_2$ heading in the world reference frame 140. Techniques to calibrate the imaging device reference frame 150 to the world reference frame 140 are many, some of which are described in detail in commonly assigned U.S. patent application Ser. No. 12/435,486, filed May 4, 2009 and therefore not repeated herein.

In the exemplary embodiment, the PSD 111 is a standard video camera utilizing a highly integrated sensor technology, such as CMOS, with a megapixel or more of resolution, and capable of capturing frames of image data provided by the FOV 132. In such an embodiment, the PSD 111 may capture images of the object 110 within the optical field of view 125 and communicate that image data to the computing device 115. In alternate embodiments, the PSD 111 may be Z-camera (a single lens video camera capable of capturing video with depth information) or a stereo video camera with two or more lenses that can capture three-dimensional images.

For those embodiments including the PSD 121, the PSD 121 may be any of the optical position sensing devices described for the PSD 131. As described further elsewhere herein, the PSD 121 is to assist in determining how the projected pattern is to be steered so as to provide a good positional reference to the PSD 131. In exemplary embodiments, the PSD 121 is a megapixel camera or a simpler segmented photodiode detector capable only of light centroid detection rather than full frame imaging.

Referring now to operation 214 in FIG. 2, positional data is determined for the object 110 at least in part from identifiable radiation associated with the projected reference pattern. As used herein, "positional data" includes at least one of displacement of the object 110 from a reference point and any one or more of the Euler angles of pitch, yaw and roll. Displacement of the object 110 may be characterized by inclination θ, azimuth φ and radius r in spherical coordinates) or Cartesian coordinates $x_1$, $y_1$, $z_1$ in the imaging device reference frame 150 where z is the distance between the object and the PSD 111. For CMOS camera embodiments of the PSD 131, images collected by the PSD 131 may be analyzed, for example by the computing device 115, using known techniques to determine the location and orientation of the object 110. Thus, based on visual image data derived from the projected pattern, the position of the object 110 may be determined as a function of time (e.g., real time). For photodiode embodiments of the PSD 131, centroid information collected by the PSD 131 is analyzed where changes in these x-y sensor measurements representing centroid displacement are correlated to relative displacement of the object 110. As described elsewhere herein, for particular embodiments where object positional data is derived from both the PSD 111 and PSD 131, improved accuracy and robust operation may be achieved by deriving one or more component of object positional data from the projected pattern while another positional data component is derived through the processing of images of the object 110. Alternatively, redundant information derived from both the PSD 111 and PSD 131 may be reconciled for improved SNR relative to a single sensor. Finally, with the position of object 110 determine, one or more graphical objects displayed on the display 120 may then be controlled at operation 216 using any technique known in the art.

Figure 3:
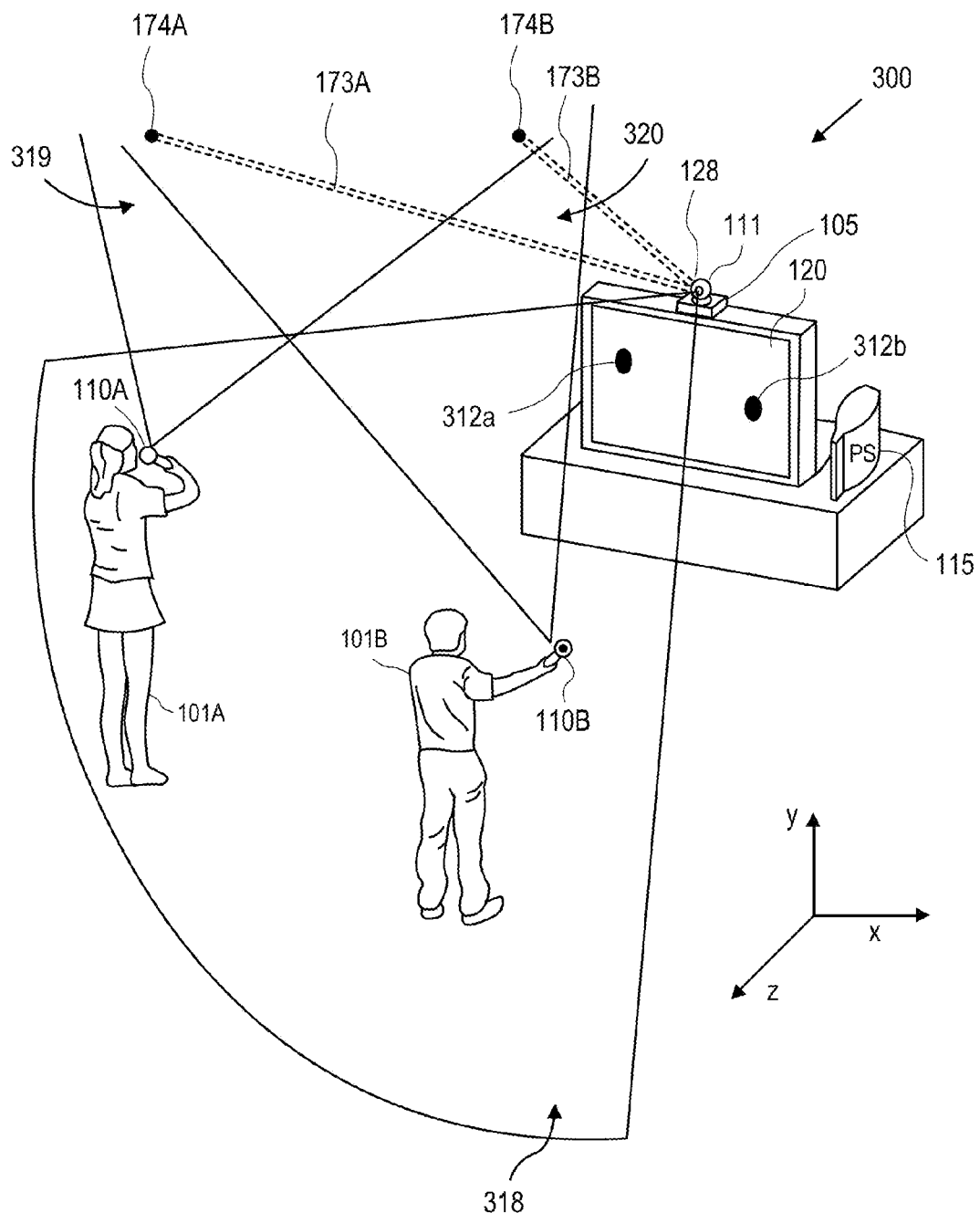
FIG. 3 illustrates an isometric view of a multiplayer environment, in which a projection-based tracking system is employed to control graphical avatars associated with different users, according to one embodiment.

FIG. 3 illustrates an isometric view of a multiplayer environment 300, in which a projection-based tracking system is employed to control graphical avatars associated with different users, according to one embodiment. In the multi-player environment 300, the same components described in the tracking system 100 (FIG. 1) are employed for tracking two objects, 110A and 110B. As shown in FIG. 3, player A is associated with the object 110A which controls avatar 312A on the display 120 while player B is associated with the object 110B which controls avatar 312B. For the exemplary embodiment, the tracking system includes a reference pattern comprising the beacons 174A and 174B, projected on the ceiling for example, to span an area large enough for at least one PSD 131A, 131B, in each tracked object to collect a sufficient portion of the reference pattern within the respective fields of view 319, 320 for a determination of positional data for each of the objects 110A and 110B. As the PSDs 131A and 131B may then be referenced to a same projected pattern, a relative position and orientation between the two objects 110A and 110B may be rapidly computed. In certain embodiments, the projection-based positional tracking system 100 may thereby enhance interaction between multiple tracked objects.

Figure 4:
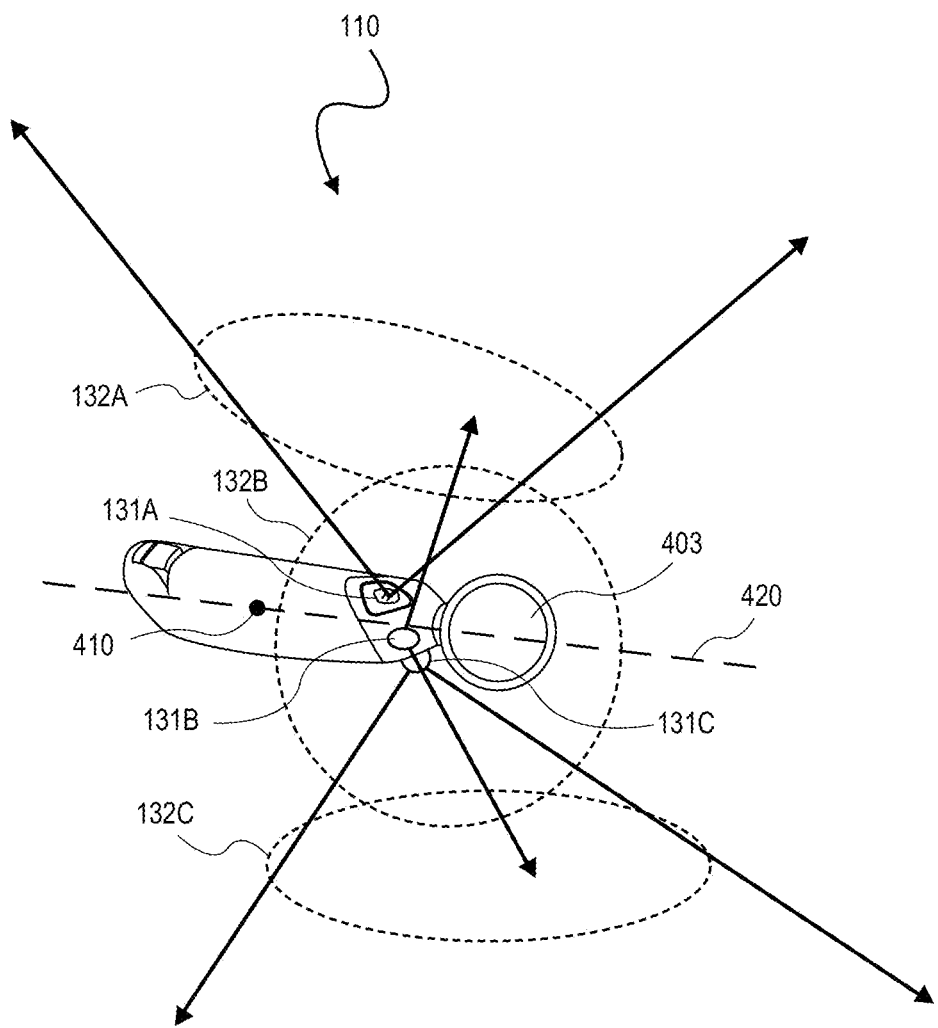
FIG. 4 is an isometric view of an object to be tracked in a projection-based object tracking system having an embedded optical sensor, according to one embodiment.

FIG. 4 illustrates an exemplary object 110 in the form of a handheld game controller. Portions of the object 110 may include a section 403 having visual attributes to enhance tracking based on visual image data collected by the PSD 111, such as spherical shape and/or colored illumination, as commercially available in the Sony Playstation® Move. In further embodiments, the object 110 is an electronic device that includes or is connected with one or more inertial sensors. While the object 110 is a handheld controller in the exemplary embodiment, the salient features described herein for the object 110 may readily be adapted to virtually any other controller, handheld, or wearable device known in the art, such as headgear, footgear, clothing, etc.

For the embodiment illustrated in FIG. 4, the object 110 includes a plurality of PSDs 131 having a predefined displacement from the object centroid 410 and a predefined orientation relative to each other forming a compound positional sensor. In the case of a game controller, a number of PSDs 131 disposed on the object surface may make efficient use of the controller surface area which might otherwise serve little more than an ergonomic handling function. Generally, any number of PSDs 131 may be embedded in or disposed on surfaces of the object 110 and may be operated collectively as a compound sensor to increase the object's effective field of view of the projected pattern radiation, as further illustrated in FIG. 5.

Figure 5:
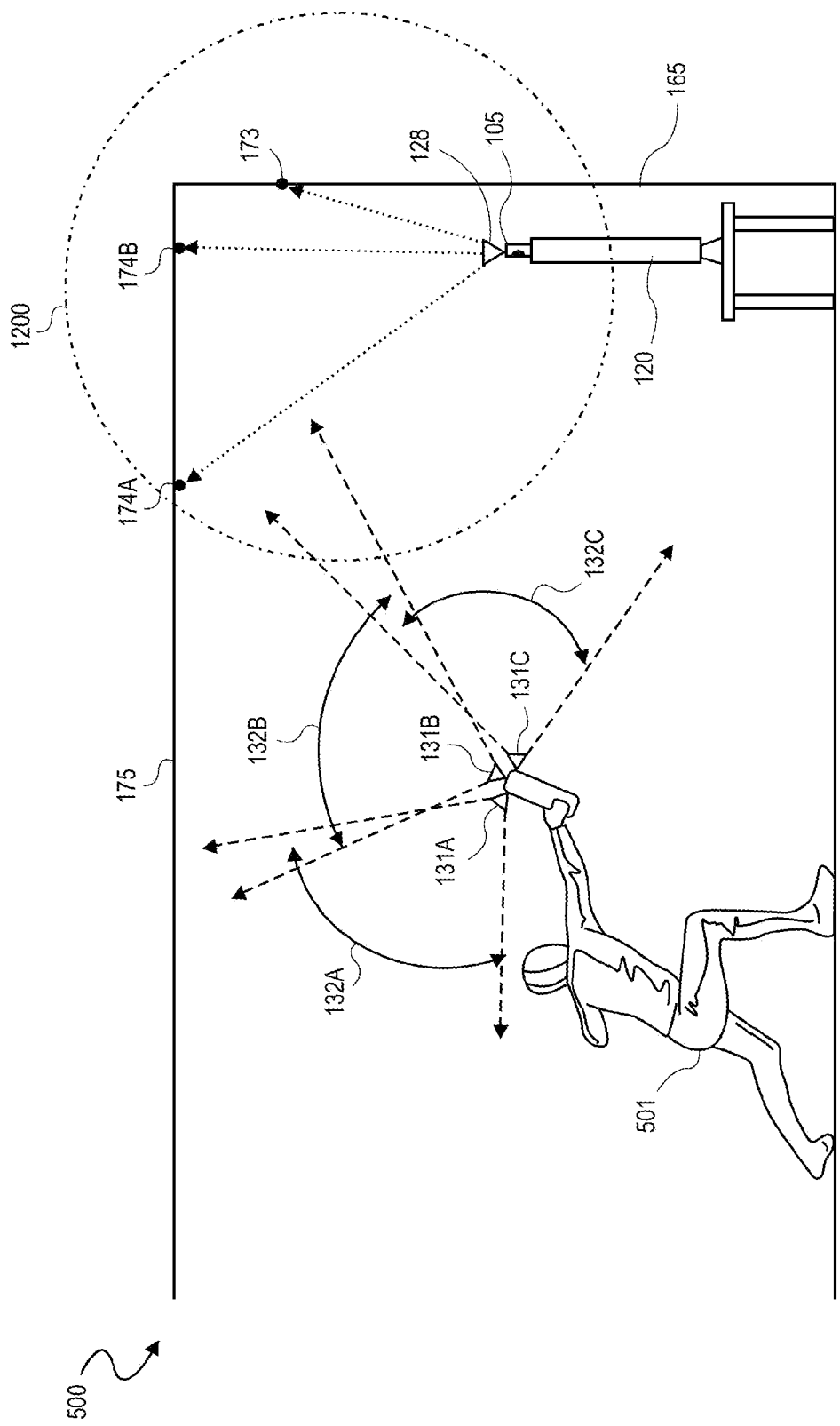
FIG. 5 is a side view of a room of a projection-based object tracking system, in accordance with one embodiment of the present invention.

Each PSD 131 in the compound sensor includes, or is connected with, optics providing a certain field of view to the sensor surface. As shown in FIGS. 4 and 5 for example, the PSDs 131A, 131B and 131C have fields of view of 132A, 132B and 132C, respectively. In the exemplary embodiment, the angular FOV of each PSD overlaps with a nearest neighboring PSD such that the effective FOV of the population of PSDs 131 may be increased without reducing the sensitivity of any particular PSD 131 as would wide angle optics.

As further illustrated in FIG. 5, the predefined locations of each PSD on the object 110 are selected to ensure at least some PSDs are not occluded by a user's hand or the object body during use and to provide sensor surfaces at enough orientations to sense the projected beacons 174A, 174B, etc. over a the wide range of object orientations typical of a game controller. In the exemplary embodiment illustrated in FIGS. 4 and 5, adjacent PSDs 131 have angular FOV centers 30° to 60° apart to provide FOV overlap while also providing an effective PSD field of view spanning 360° about the object's longitudinal axis 420. The object longitudinal axis is defined as the axis which is to be pointed by a user (e.g., user 501 in FIG. 5) at the display 120 when aiming at a graphical target. Yaw of the object 110 is often an important component of the object positional data, particularly in the gaming context where small errors in determination of the heading of the longitudinal axis 420 can be perceived by the user and thereby hinder realistic game play. Providing a 360° PSD FOV about the longitudinal axis 420 may enable the projection-based tracking to accurately determine object yaw regardless of object pitch or roll.

Figure 6:
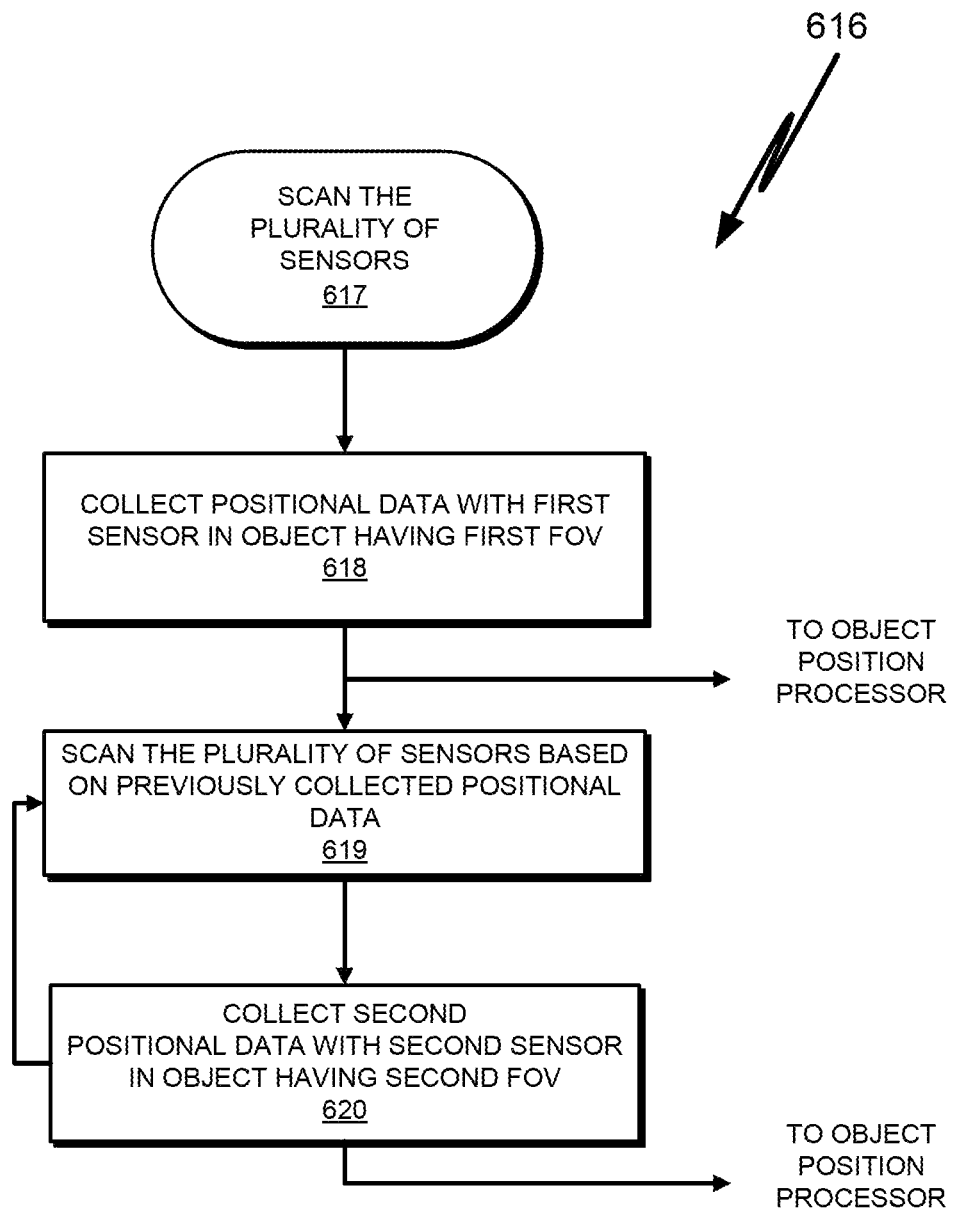
FIG. 6 is a flow diagram of an exemplary method for determining an object position based on multiple sensors embedded in the object, in accordance with an embodiment.

FIG. 6 is a flow diagram of an exemplary method 616 for determining an object position based on multiple sensors embedded in the object, in accordance with an embodiment. Depending on the orientation of the object 110, one or more of the PSDs 131 may be in shadow with the projected pattern outside of the sensor's FOV. As such, each of the plurality of PSDs 131 may be sampled at operation 617, for example on a round robin basis, while the system is in a default scanning state. The scanning operation 617 may be conditioned on a sensor detecting a centroid of a threshold magnitude above ambient and therefore associated with reflected radiation from the projected reference pattern (for embodiments where the PSDs 131 are simple sectored photodiode detectors), or conditioned on a sensor outputting a recognizable feature of the projected pattern (for embodiments where the PSDs 131 are video cameras).

Upon either event, positional data is collected at operation 618 from a first PSD 131, for example PSD 131A from FIGS. 4 and 5. The positional data collected (e.g., a centroid x-y) is to be processed to determine object positional data. At operation 619, the plurality of PSD 131 may be read out via an algorithm which weighs more heavily one or more PSD 131 having an orientation and or position proximate to the PSD providing the first positional data. In the exemplary embodiment, the sampling algorithm employed at operation 619 may read out positional data from the plurality of PSDs 131 with individual sensor sampling rates that are based on the positional data collected at operation 618. For example, where PSD 131A detects a centroid at a far edge proximate to the FOV of PSD 131B, PSD 131B and 131A are read out at a higher rate, for example 500 Hz or more, while PSD 131C is read out at a lower rate, for example 100 Hz. The positional data collected (e.g., centroid x-y) is again forwarded for processing to determine object positional data based on the known position of the second sensor within the object 110 relative a reference point, such as centroid 410. The method 616 then proceeds to loop and track a feature of the projected pattern, performing handoffs between various PSDs 131. For embodiments where nearest neighboring PSDs 131 have overlapping FOV multiple sensors may output a centroid allowing for a higher effective centroid sampling rate than possible for a single PSD (having a given photodiode performance) and/or averaging of centroid outputs between sensors for improved SNR.

Figure 7A:
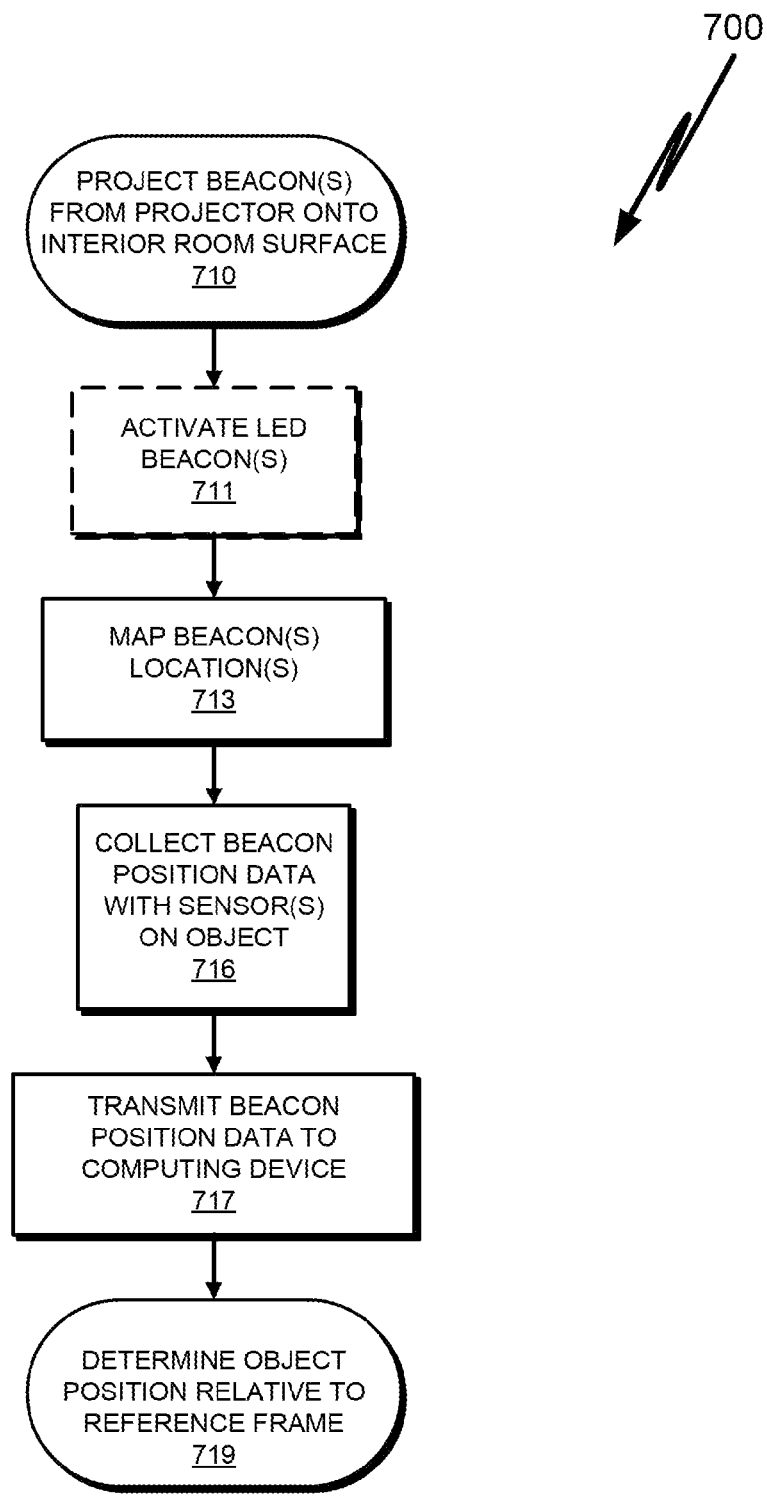
FIG. 7A is a flow diagram of an exemplary method for determining an object position from an array of beacons projected on an interior room surface, in accordance with an embodiment.

FIG. 7A is a flow diagram of an exemplary method 701 for determining an object position from a projected reference pattern comprising an array of projected beacons, in accordance with an embodiment. For the method 701, the PSD 131 is preferably a simple multi-sectored photodiode (e.g., a quadrant device) which is capable of higher centroid output bandwidth than full-frame camera sensors having a high pixel count (e.g., thousands to millions). Generally, complete determination of an object's position and orientation within the world reference frame 140 requires correlation of a centroid with a plurality of beacon locations. In the gaming context where object 110 may move in three dimensions, four beacons locations correlated to four centroid positions is sufficient with positional tracking accuracy, range and directional invariance all improving with greater number of beacons.

Method 700 begins with projecting one or more of the plurality of beacons from the projector 128 onto an interior surface of a room at operation 710. Projection of at least some of the beacons offers the advantage of a large reference space on par with a gaming environment where the object 110 may be displaced by 8-10 feet or more from the display 120. Projection also offers the advantage of flexible beacon positioning within a variety of indoor environments where affixing emissive beacons, such as LEDs would be awkward.

Figure 8A:
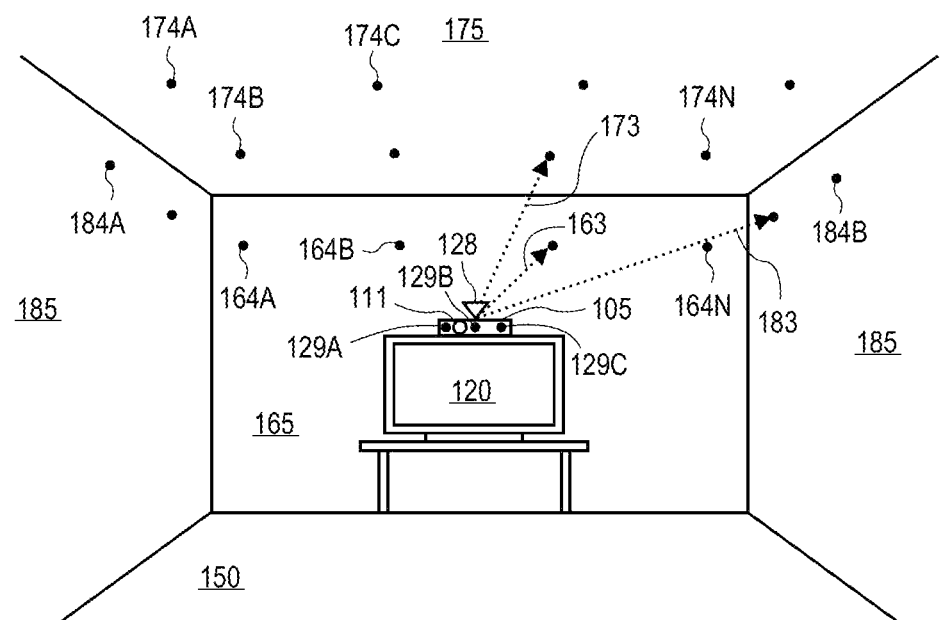
FIG. 8A is a perspective view of a room in which a pattern of beacons are projected on interior room surfaces, in accordance with an embodiment of the invention.

FIG. 8A is a perspective view of a room in which a pattern of beacons are projected on interior room surfaces, in accordance with an embodiment of the invention where at least one beacon 174A is projected on the room ceiling 175. Projection on the ceiling offers many advantages. For example, projected radiation will typically not be cast onto a system user. Ceiling surfaces also offer an expanse that is often planar over the extent of the game space (i.e., 8-10 feet from the display). Ceiling surfaces are also typically free of significant obstructions, such as furniture or decorum typically found on other interior room surfaces which may occlude a beacon line-of-sight projection or otherwise distort determination of the beacon location.

As illustrated in FIG. 8A, a plurality of beacons 174A, 174B, 174C . . . 174N are projected from the projector 128 to the ceiling 175 to form a array covering a wide area, for example, 10×10 feet, or more, and having a known topology. The array may be regularly spaced, however the beacons don't need to be aligned along any axis or at grid vertexes. Preferably, each beacon approximates point light sources for PSD 121 to have best two-dimensional centroid resolution. As further illustrated in FIG. 8A, additional beacons 164A, 164B and 164N are projected on rear wall surface 165 in further embodiments. Similarly, additional beacons 184A and 184B are projected on side wall surfaces 185. Wall surface projections, particularly those on the rear wall surface 165 offer a two dimensional beacon array space which may improve determination various positional components. In further embodiments, illustrated as an optional operation 711 in FIG. 7, one or more emissive non-projected beacons, such as an LED, are activated along with the projected beacon. In the exemplary embodiment illustrated in FIG. 8A, LED beacons 129A, 129B, and 129C are disposed on a front side of the imaging device 105 (i.e. to be facing the object 110). In such embodiments the presence of a relatively high density of beacons proximate to the imaging device 105 may advantageously provide a two dimensional beacon array space, and/or assist with calibrations or identification of a home reference point proximate to the PSD 111.

Generally, each beacon is to be identifiable from the others. Depending on the embodiment, this differentiation may be made in the time domain or frequency domain. For example, in the frequency domain each of the projected beacon may be formed with a beam of radiation having a unique wavelength (e.g., $\lambda_{174A}$, etc.). Alternatively, time domain differentiation may be utilized to allow all beacons to be projected with same radiation wavelength that can be best distinguished from background noise typical to a room environment and preferably outside the visible spectrum, such as within the near IR band (e.g., 0.7 to 0.9 μm) or even far IR band (e.g., 0.9 μm to 1.0 μm). Time domain differentiation generally entails projecting the beacons at operation 710 and modulating beacon amplitude at operation 711 in a time divided manner in which the illumination time for each beacon is synchronized (i.e., strobed) with the collection operation 716 performed by the PSD(s) 131. A PLL or other known timing circuitry may be utilized for the purpose of timing the beacon beam projection with PSD centroid sampling.

As the beacons are projected to one or more interior room surfaces, at operation 713 one or more projected beacon locations are mapped, for example relative to the imaging device 105, or any component thereof (e.g., a LED beacon 129, PSD 111, or PSD 111). As such, operation 713 may be performed prior to use of the tracking system 100 for game play, for example. Projected beacon locations may be estimated exclusively on the basis of the relative projection angles given a predefined position and orientation of the projector relative to the reference point under the assumptions that the interior room surface screening the beacon projection is planar and intersects walls which are orthogonal. Alternatively, beacon coordinates may be manually entered by a user. In a preferred embodiment however, one or more of the PSDs 131, 121, or 111 are used to during a calibration phase to automatically map the projected beacon locations, for example by executing a triangulation algorithm. In one such embodiment, the PSD 121 (FIG. 1) mounted proximate to the projector 128 views a given beacon (outputting a centroid for photodiode based PSD 121 embodiments) or pattern (outputting an image for processing to determine the location of a beacon within the FOV 122). Where image processing is not employed, a correlation between the relative positions of the PSD 121, and projector 128 along with known projection beam angles permit triangulation of the projected beacon positions. To further accommodate non-planarity in the beacon screening surfaces embodiments may also employ time of flight measurements using the PSD 121 and projector 128 where the projected beam is coherent light, for example from a laser emitting in the IR band. In still other embodiments, positions of each beacon location is deduced through determining the position and orientation of the object 110 by a first means and then mapping the beacons with the PSD 131 to correlate the projected pattern feature/beacon locations to the position/orientation of the object 110.

At operation 716, with one or more of the projection beams 163, 173, 183 (and/or LED beacons 129) are triggered at a given time, the associated sampling of the PSD collects a centroid of the radiation reflected from the corresponding mapped locations of beacons 164, 174, 184 (or emitted from LED beacons 129) as imaged by the PSD optics to a particular location on the sensor surface of a given PSD 131. PSDs are well known in the art, so a detailed description of the many manners in which positional information for light spot may be obtained from a specific PSD implementation is not provided herein. Regardless of the collection technique, beacon positional data is transmitted, e.g., wirelessly) from the object 110 to a processor which relates the beacon positional data to positional data describing the position/orientation of the object 110 within a given reference frame (e.g., world reference frame 140) at operation 719.

Figure 7B:
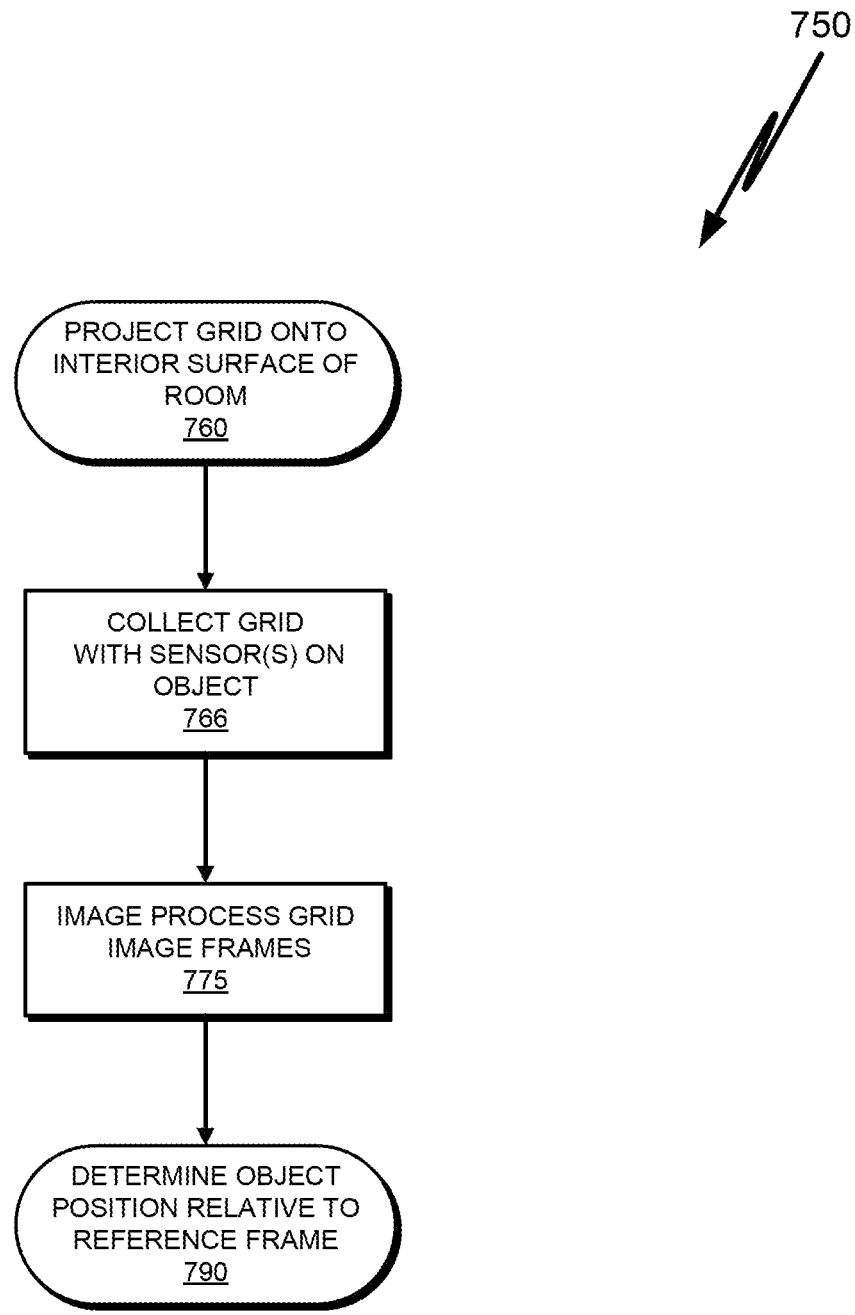
FIG. 7B is a flow diagram of an exemplary method for determining an object position from a grid pattern projected on an interior room surface, in accordance with an embodiment.

FIG. 7B is a flow diagram of an exemplary method 750 for determining an object position from a grid pattern projected on an interior room surface, in accordance with an embodiment. For the method 750, the PSD 131 is preferably a standard video camera incorporating a high pixel count (e.g., thousands to millions) sensor.

Figure 8B:
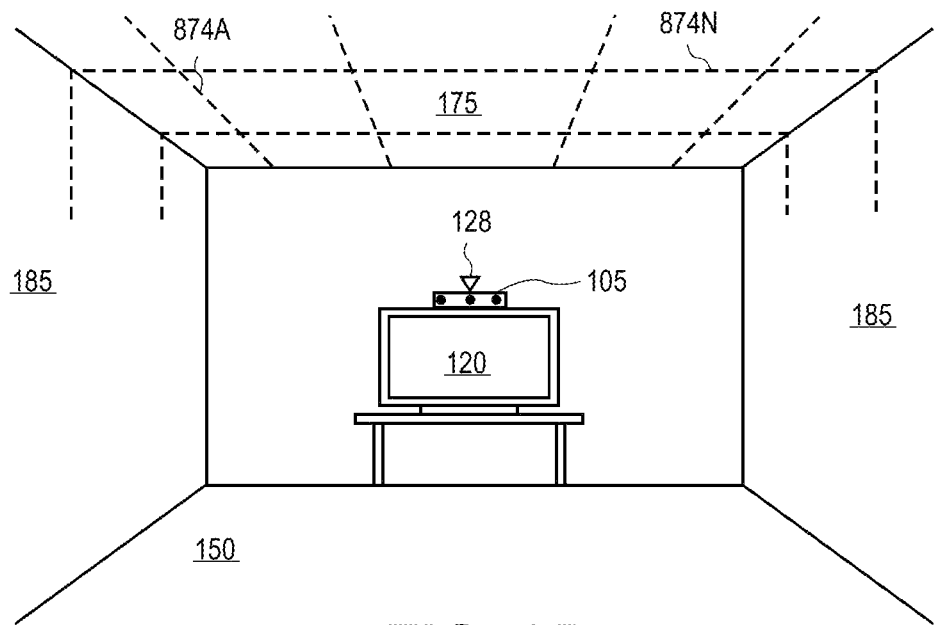
FIG. 8B is a perspective view of a room in which a line pattern is projected on a room ceiling, in accordance with an embodiment of the invention.

Method 750 begins at operation 760 with projecting on the interior room surfaces a pattern having features which are readily identifiable by a pattern recognition algorithm and provide orientation queues from which the object orientation may be referenced. In embodiments, the projected pattern comprises a plurality of interconnected repeating units, preferably defining orthogonal edges. In the exemplary embodiment, a grid pattern is projected at operation 760, as illustrated in FIG. 8B depicting a perspective view of a room in which a grid pattern 874A, 874N is projected on the room ceiling 175. Checkerboard patterns and other polygonal meshes are alternative patterns. In embodiments, the grid pattern projected at operation 760 is a fixed pattern rather than sequenced or scanned as the PSD 121 is a camera and the grid is a reference pattern rather than a sensing pattern. As such, time variation in the images collected by the PSD 121 at operation 766 identified by processing of the images at operation 775 and attributed to changes in the orientation of the object. Using known image processing techniques at operation 790, positional information of the object 110 is determined in a given reference frame (e.g., world reference frame 140) to complete method 750.

Figure 9A:
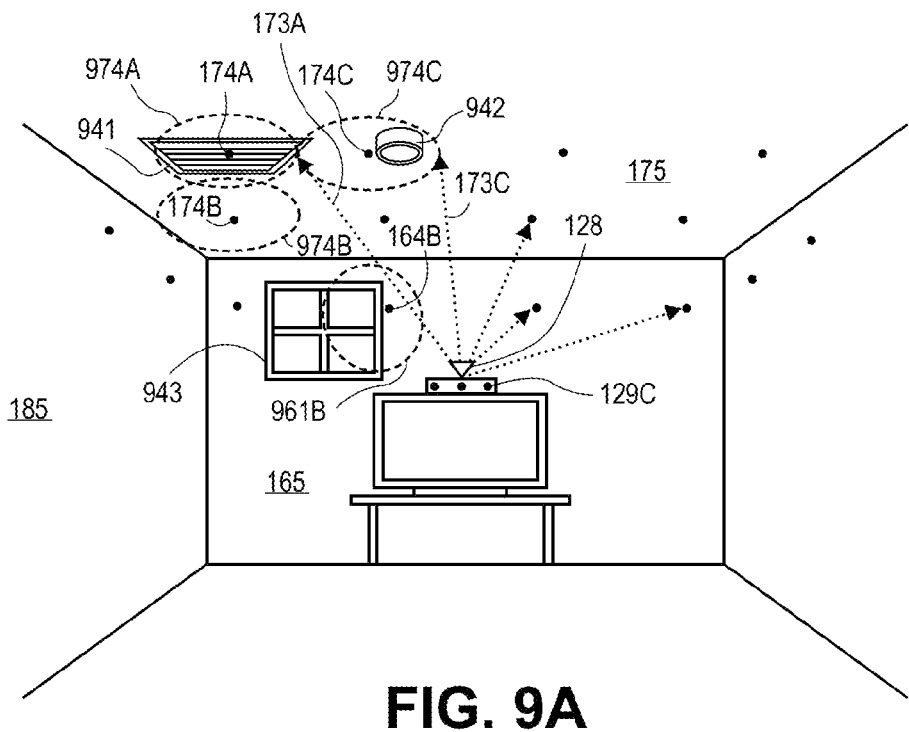
FIG. 9A is a perspective view of a room in which beacon projections are steered around obstructions on interior room surfaces, in accordance with an embodiment of the invention.

In an embodiment, the projected reference pattern is steerable to locate one or more features/beacons at locations on the interior room surface free from obstructions and/or non-planarity. FIG. 9A illustrates a perspective view of a room in which beacon projections are steered to avoid obstructions on interior room surfaces, in accordance with an embodiment. As illustrated, any given interior surface, even the room ceiling 175, may include obstructions, such as HVAC ducting 941, a light fixture 942, a skylight/window 943, etc., which might occlude or distort one or more of the projected beacons. Such occlusion or distortion may prevent a positional data determination based on a projection beacon pattern, or at least reduce the accuracy of the determination. In the exemplary embodiment each beacon location is steered in search for a location which will provide a good beacon signal to the PSD 121. For example, in one embodiment projection area is divided into beacon zones with the projection beams 173A and 173C each steerable within the beacon zone 974A, and 974C, respectively, to identify beacon locations offering a more suitable reference point than the default locations of beacons 174A and 174C. Beacons projected on a wall may be similarly steered (e.g., the beacon location 164B may be positioned anywhere within the zone 961B). Beacon zones may form a perimeter of any shape about the default locations, for example spanning a half pitch of the default beacon locations, or more.

Figure 10:
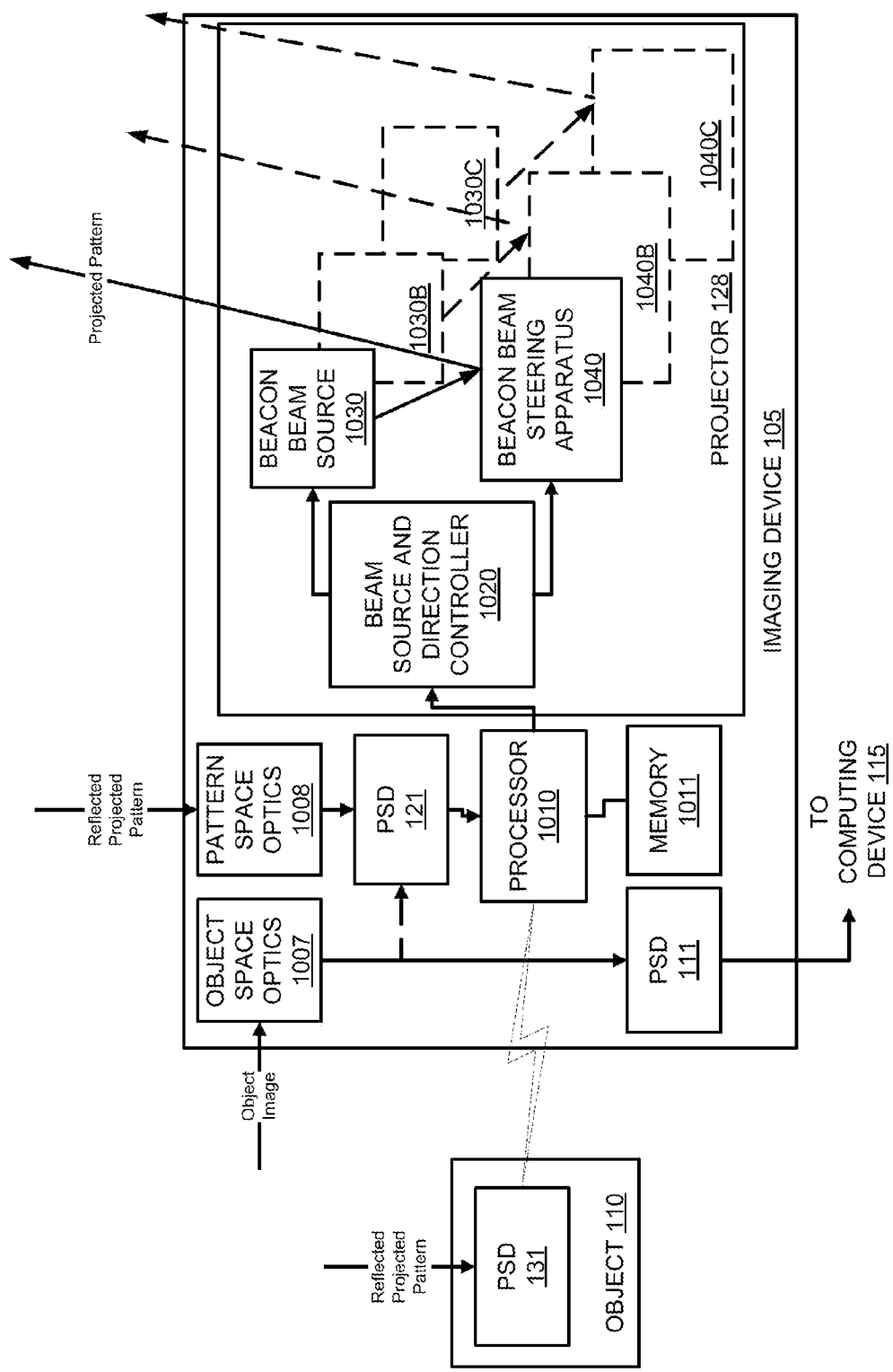
FIG. 10 is a functional block diagram of modules of a projection-based object tracking system having a steerable projector, in accordance with one embodiment of the present invention.
Figure 11:
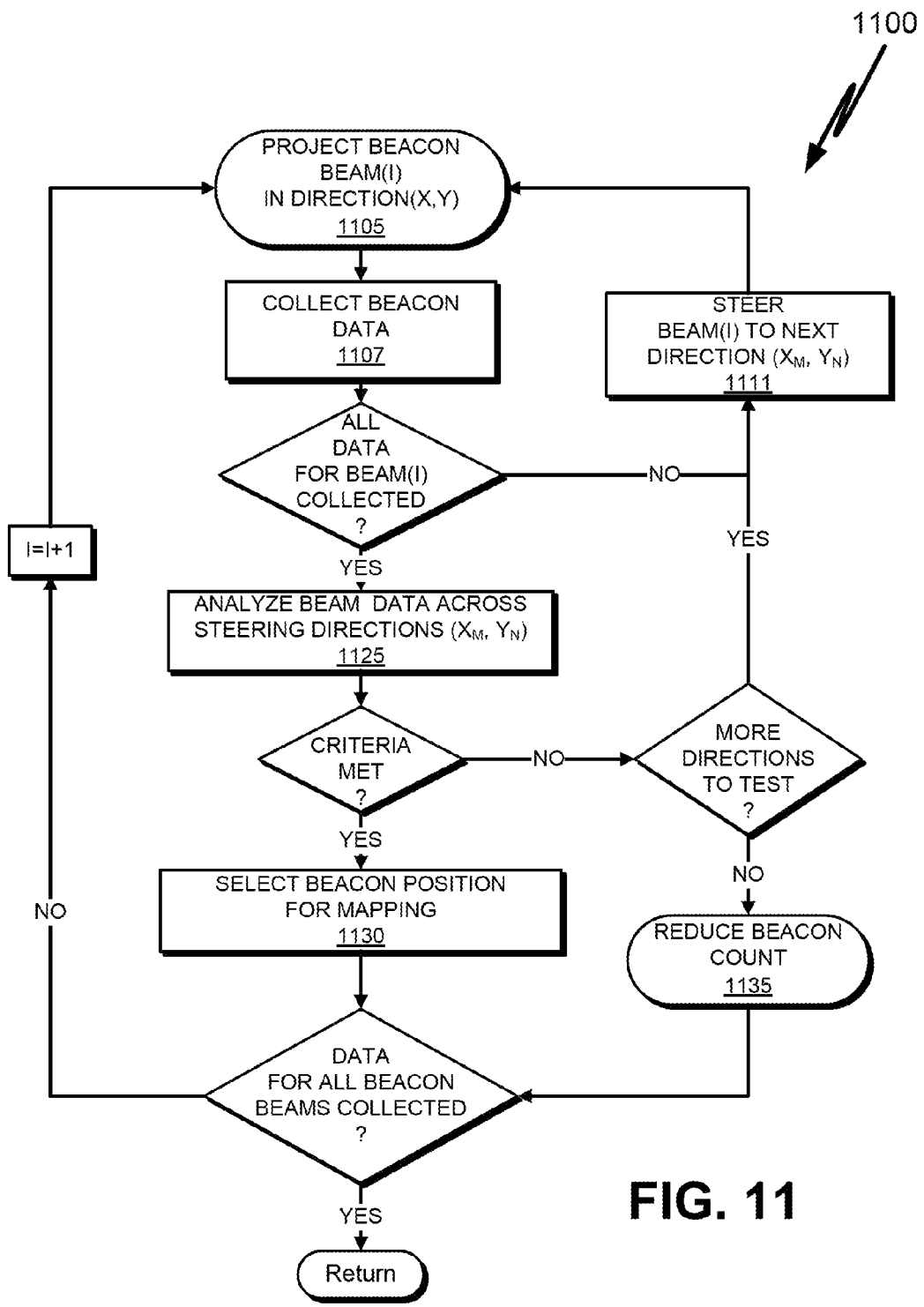
FIG. 11 is a flow diagram illustrating a method of determining projected beacon locations providing a good positional reference, in accordance with one embodiment of the present invention.

FIG. 10 is a functional block diagram of modules in a projection-based object tracking system in which the processor 1010 automatically executes the steering and mapping method 1100 illustrated in FIG. 11 to avoid room obstructions as depicted in FIG. 9A, in accordance with one embodiment. Generally, the goal of the method 1100 is to automatically determine where beacons may be projected on an interior room surface to facilitate projection-based tracking of the object 110. The method 1100 may also applied to position a projection pattern comprising interconnected repeating units, such as that depicted in FIG. 8B. However, fixed, non-steerable projection systems are generally adequate in embodiments using such patterns because obstruction avoidance is less important due to the additional capabilities of image processing.

Beginning at operation 1105, a beacon beam(i) is projected in a direction defined by an angle or in a x-y coordinate of a steering apparatus. Referring to FIG. 10, the imaging device 105 includes as the projector 128 a beacon beam source 1030 which is preferably a laser with an emission spectrum in the IR band. While a laser offers the advantage of optical simplicity easily maintaining focus over the distances typical for projection in the tracking system 100, non-lasing discharges and conventional LED sources may also serve as the beam source 1030 along with the associated focusing optics. The projector 128 further includes a beacon steering apparatus 1040. The steering apparatus 1040 may be any known in the art for the chosen beam source 1030, such as piezoelectric-driven transmissive and reflective optical path modulators, including lenses, diffraction gratings, mirrors, and the like. In one exemplary embodiment, the steering apparatus 1040 is a MEMs micromirror having one or more mirrors controllable over a range of x-y tilt angles. Such micromirror subsystems are commercially available in certain pico projector implementations. Other embodiments may employ digital light processing (DLP) or liquid crystal on silicon (LCOS) projection technologies. To project a plurality of beacons successively, the beam source 1030 may be controlled by the controller 1020 to emit a pulse a predetermined times in conjunction with control of the beam angle defined by the steering apparatus. Timed bursts can then be successively sequenced at discrete mapped beacon locations.

In other embodiments, multiple beam sources (e.g., 1030B and 1030C) may project the plurality of beacons either in succession or concurrently. Each of the beam sources 1030, 1030B and 1030C may be optically coupled to the same steering apparatus 1030 (e.g., each beam impinging on one or more mirrors in a single MEMs mirror array) or simply through a plurality of discrete steering apparatuses (1040, 1040B, and 1040C). In still other embodiments, diffraction gratings or other known dispersive elements may be employed to separate a single beam into a plurality of beams having a known pattern geometry (e.g., gridded points, spoked line pattern, etc.).

Figure 9B:
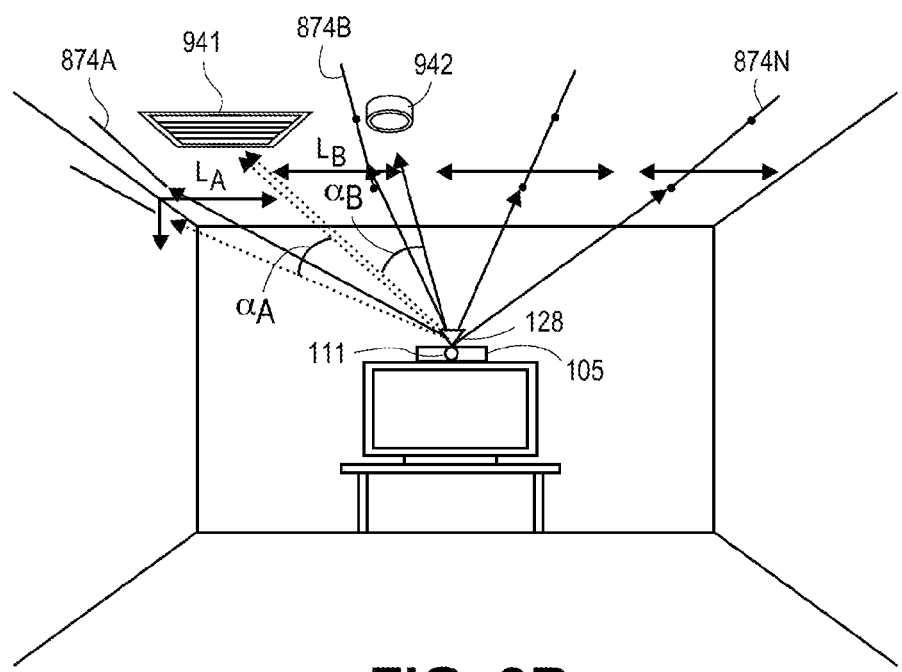
FIG. 9B is a perspective view of a room in which line projections are steered to form a reference pattern on an interior room surface, in accordance with an embodiment of the invention.

Returning to FIG. 11, at operation 1107 data is collected for the beacon beam(i). Where the projection system casts a single beacon at a time, the data collected at operation 1107 corresponds to only one beacon. The data collected at operation 1107 is a function of whether PSD 121 or 131 performs the collection at operation 1107 and what technology implements that PSD (e.g., P-i-N photodiodes, CMOS image sensor, etc.) as well as what projection method is employed. For example, as illustrated in FIG. 9B where a diffractive projector 128 concurrently projects a plurality of beams with fixed relative angles $\alpha_A$ and $\alpha_B$, the data collected at operation 1107 corresponds to the plurality of lines cast by the beams. The projected pattern 874A, 874B . . . 874N may then be steered as a unit along lengths $L_A$, $L_B$ to avoid obstructions 941, 942.

In embodiments, at least intensity and positional data is collected at operation 1107. The sensor collecting at operation 1107 is to have a known position and orientation to a reference point in common with the projector. In one such embodiment, as further illustrated in FIG. 12 (depicting an expanded side view of the region 1200 illustrated in FIG. 5), the PSD 121 integrated into the imaging device 105 collects the beacon data at operation 1107. As further illustrated in FIG. 10, the PSD 121 is coupled to pattern space optics 1008 having a FOV 122 spanning the projection steering range. The PSD 121 may be utilized exclusively for the purpose of monitoring the projected pattern as a pickup for feedback control of the projected pattern and therefore offers advantage of continual pattern monitoring during tracking system use (e.g., game play).

Figure 13:
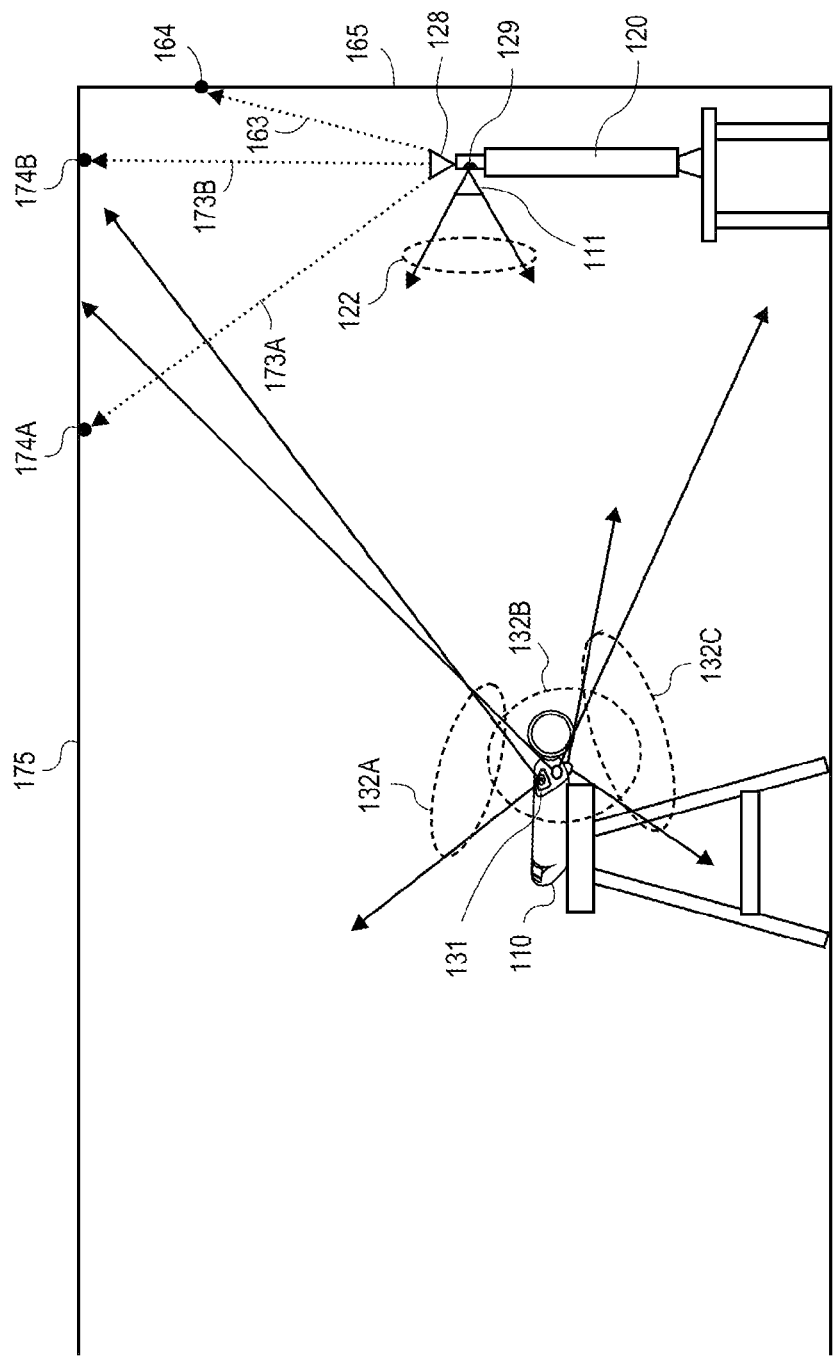
FIG. 13 is a side view depicting a system hardware arrangement for determining projected beacon locations providing a good positional reference, in accordance with an embodiment.

In another embodiment, as further illustrated in FIG. 13, the PSD 131 integrated into the object 110 collects the beacon data at operation 1107. As further illustrated in FIG. 10, the PSD 131 in object 110 is communicatively coupled to processor 1010. Various techniques may be used to first determine the orientation of a PSD 131 during a first calibration phase enabling the PSD 131 to be subsequently utilized for positioning the projected pattern to be within one or more fields of view 132A, 132B, 132C, etc. For example, orientation of the PSD 131 may first be determined from image data collected by PSD 111 containing the object 110 within the FOV 122 provided by object space optics 1007. The PSD 131 may then transmit a separate centroid of an intensity distribution associated with one or more of the plurality of beacon locations as the beacon beams 173A, 173B, 163 shown in FIG. 13 are steered. Embodiments establishing projected beacon positions based on the PSD 131 have the advantage of positioning the projected beacons based on the same sensor(s) and approximate object position within the room interior that will be subsequently used in determining the object position from the projected pattern during object tracking (e.g., at operation 212, FIG. 2).

Figure 12:
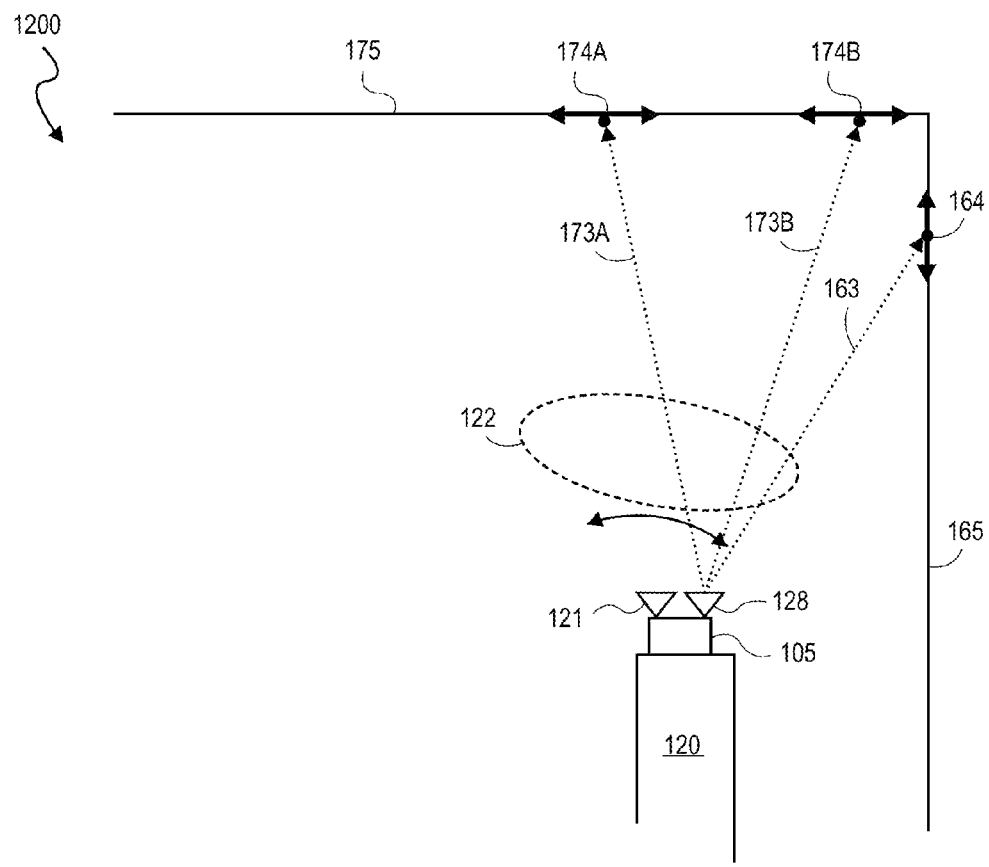
FIG. 12 is an expanded side view of the region 1200 illustrated in FIG. 5 depicting a system hardware arrangement for determining projected beacon locations providing a good positional reference, in accordance with an embodiment.

Returning to FIG. 11, after operation 1107 the beam(i) is steered to the next direction $(X_m, Y_n)$ at operation 1111 if all locations in a predefined sample plan have not yet been tested. For example, as shown in FIG. 12, beam 173A may be moved from a first beacon location 174A$_1$ to a second beacon location 174A$_2$ either at random or by way of predefined sample points of a mesh within a beacon zone (e.g., 974A in FIG. 9A). Alternatively, where all data for the sample plan has been collected, the beam data is analyzed at operation 1125 across the collected steering directions $(X_m, Y_n)$ to identify a direction satisfying the search criteria. A qualifying direction is then selected at operation 1130 for mapping beacon position.

In embodiments, the collected beam data is compared at operation 1125 and a position selected at operation 1130 based on a beacon visibility criteria and/or a spatial relationship among the plurality of beacons. In a first embodiment, the processor 1010 is to analyze the collected data by comparing the intensity of the reflected radiation across the steering directions $(X_m, Y_n)$. Projection directions may be sorted by intensity or power to identify beacon locations which meet a threshold level of intensity. Locations with beam directions having low intensity are then eliminated as occluded or otherwise unsuitable.

In a further embodiment, the processor 1010 is to analyze the collected data by executing an algorithm to maximize spacing or uniformity in the beacon spacing. Assuming various projection directions for beam(i) meet a threshold intensity, another beacon beam(i+1), for example, beam 173B in FIG. 12, is selected and projected at operation 1105 in another iteration of method 1100. Where another set of projection directions, for example spanning the beacon zone 974 B meet a threshold intensity, locations with each beacon zone 174A and 174B may be chosen based on spatial considerations. In one embodiment, locations of 174A and 174B are chosen from the qualifying set of locations to maximize spacing between beacon 174A and 174B. In another embodiment, locations of 174A and 174B are chosen from the qualifying set of locations to maximize uniformity of spacing among the plurality of beacons to be projected (i.e., qualifying locations are chosen for every beacon location with one basis function to achieve a uniform areal beacon density, for example).

Where no beam directions within a local region are identified as corresponding to a qualifying beacon location, the local region is invalidated and the total beacon count either reduced by one at operation 1125 (e.g., default array of 10 beacons reduced to 9) or the beacon is integrated into a different local region having multiple qualifying locations (e.g., default array of 10 beacons maintained).

In a further embodiment the processor 1010 is to steer or scan the beams to perform 3D measurement of the projection surface. Many 3D measurement algorithms are known, any of which may be performed with certain embodiments of the projector 128 and either PSD 121 or P131, as described herein. Various simplifications may be made recognizing the goal is to automatically determine where projected beacons may be placed in adaptation to the various possible interior room surfaces. In one embodiment, the collected data is analyzed at operation 1125 to maximize the number in the plurality of beacons mapped to locations which lie on a same plane. Having a planar beacon space may be advantageous for simplifying algorithms used to determine object positional data based on the projected beacon locations.

In an embodiment, planarity of the beacon space may be optimized through application of a 3D measurement algorithm to evaluate movement of a centroid of an intensity distribution associated with one or more of the plurality of beacon locations as the beacon(i) is steered to directions $(X_m,Y_n)$. The centroid movement may be compared to the beam steering parameters (e.g., change in x-y of a micromirror) to determine the centroid movement as a function of the associated beam direction change and/or beam length (distance) change. Commonly known principals of triangulation may be utilized, as well as known time of flight algorithms, to determine distances between the projector 128 and the location corresponding to a given direction. Alternate embodiments employ the PSD 131 to determine distances between a projected beacon and the LED beacon 129. For either embodiments, estimates of the location of joints between the ceiling 175 and wall surfaces 165, 185, or where a topographic feature, such as light fixture 942, is located may be readily identified at any desired resolution. Beacon locations may then be selected at operation 1130, for example, to maximize the number of beacon locations on planar surfaces of the ceiling 175, or maximize the area of the projected pattern, etc.

Figure 14:
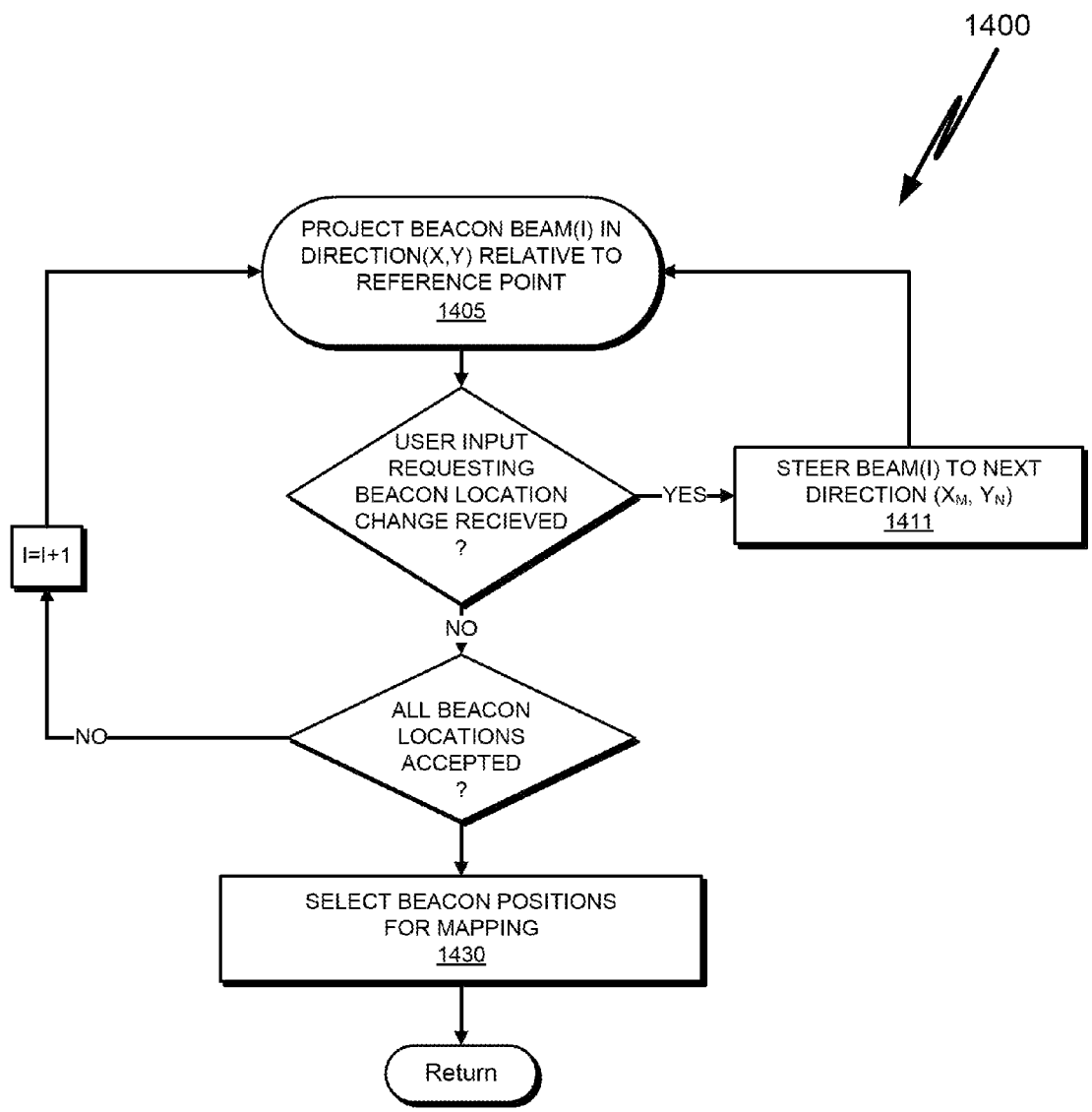
FIG. 14 is a flow diagram illustrating a method of determining projected beacon locations providing a good positional reference, in accordance with one embodiment of the present invention.

FIG. 14 is a flow diagram illustrating a method 1400 for determining projected beacon locations providing a good positional reference for tracking of the object 110, in accordance with one embodiment. The method 1400 generally relies on a user feedback of the beacon positions and therefore method 1400 begins with projecting a visible beam(i) marker at an initial default location with a beam source emitting in a visible wavelength. For this purpose, one of the beam sources 1030B or 1030C depicted in FIG. 10 may operate at a different wavelength than does beam source 1030 with the visible beam source dedicated to initial set up of the beacon projection system and the beam source 1030 then operating in a near IR band to establish a reference pattern using the beacon locations determined through method 1400.

With the visible beacon marker projected, if user input (e.g., through the object 110 or other input interface) requests a beacon location to change (e.g., due to occlusion at the default location), the beam(i) is then steered at operation 1411 in any of the manners described elsewhere herein for operation 1111. The beam steering may be in response to further user input dictating direction of the steering relative to the current location, or an alternate predefined direction may be selected automatically. The plurality of beacons is cycled through iteratively in the same manner to position each beacon at a user-specified location. At operation 1430, the user-specified locations are then mapped for subsequent use with an IR laser as the reference beacon positions for tracking of object 110, for example as in method 200 (FIG. 2).

Figure 15:
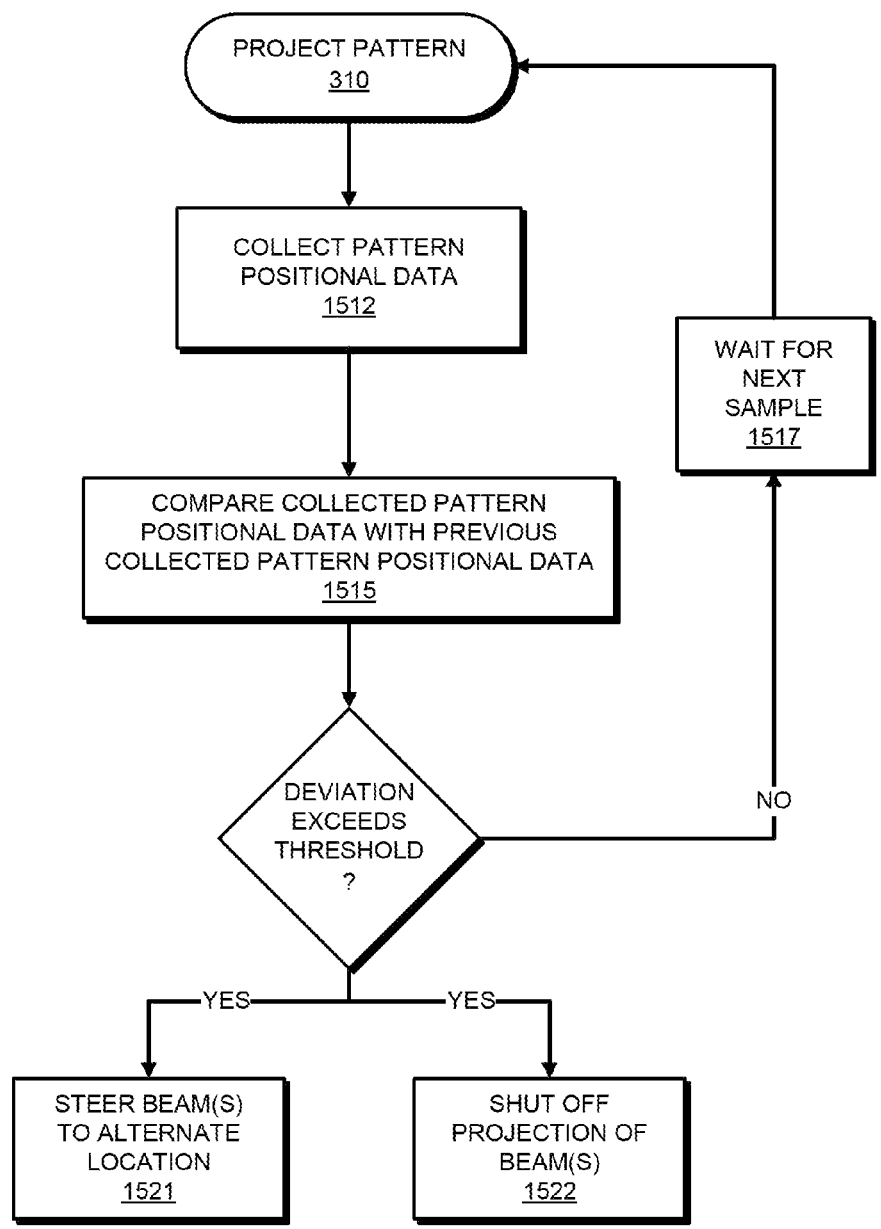
FIG. 15 is a flow diagram illustrating a method of monitoring a projected pattern over time and responding to changes occurring to the reference pattern, in accordance with an embodiment of the present invention.

FIG. 15 is a flow diagram illustrating a method 1500 for monitoring a projected pattern over time and responding to changes occurring to the reference pattern, in accordance with an embodiment. Where the imaging device 105 includes the PSD 121, the PSD 121 may be utilized to monitor the projected pattern over time in addition to serving the beacon positioning function described elsewhere herein. Through such monitoring, the tracking system 100 can automatically respond to any new obstructions placed in the projector's lines of sight since beacon positions were last selected. When method 200 (FIG. 2) is executed based pattern positional data collected by the PSD 131, the method 1500 is executed based on pattern positional data collected by the PSD 121. Method 1500 begins at operation 310 with projecting the previously selected pattern. At operation 1512, the PSD 121 collects pattern positional data, for example from the vantage of the imaging device 105. At operation 1515, the collected pattern positional data is compared to previously collected pattern positional data, for example by processor 1010. With each cycle of method 1500, if a deviation in the pattern positional data over time exceeds one or more threshold criteria (e.g., a beacon centroid intensity or beacon centroid location threshold), one or more beams are either steered to an alternate location at operation 1521 (e.g., an alternate set of qualifying beacon locations identified by method 1100) or shut off at operation 1522.

Figure 16:
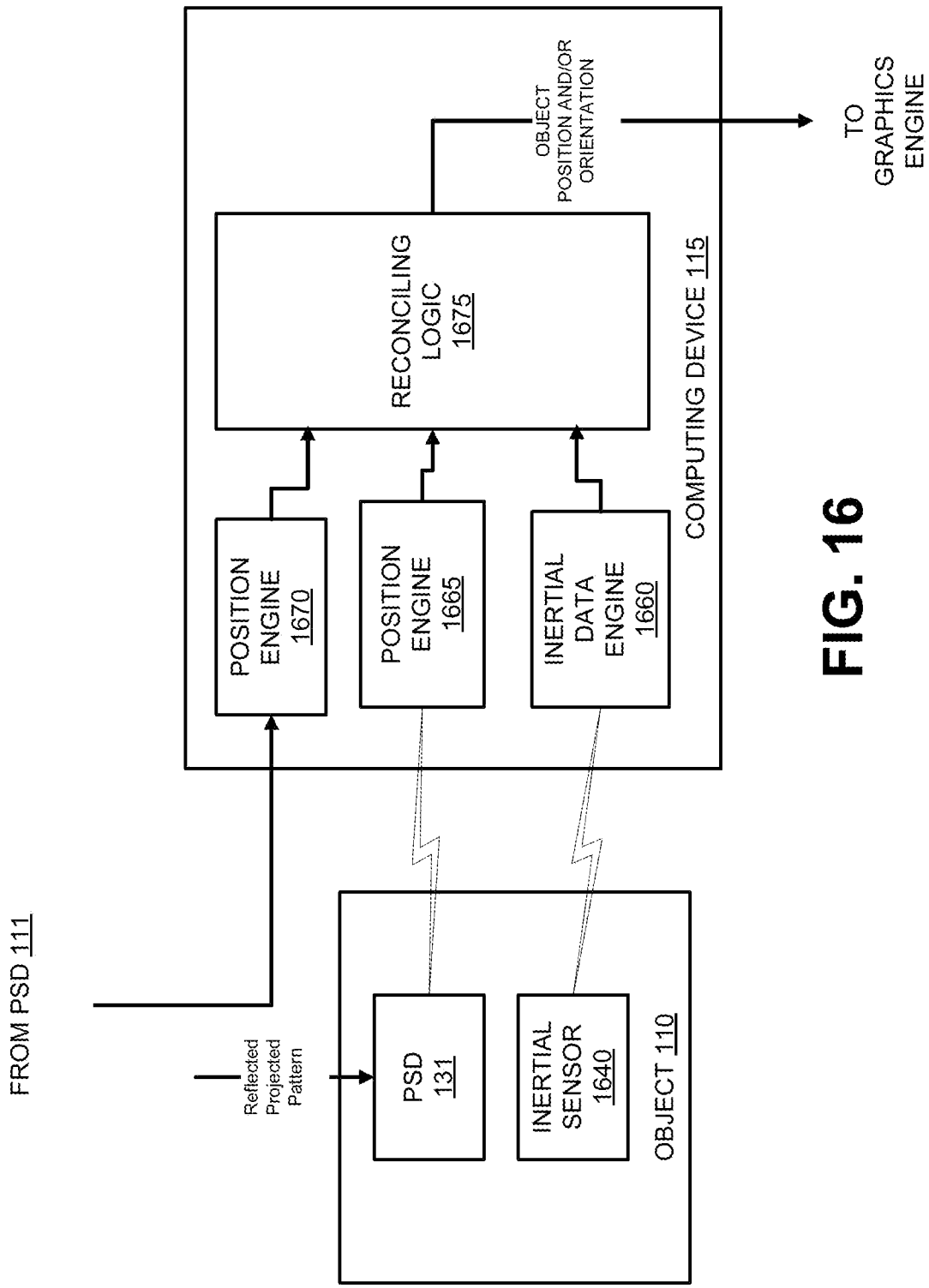
FIG. 16 is a functional block diagram of modules of a hybrid object tracking system utilizing projected pattern, object image, and inertia-based object positional data, in accordance with one embodiment of the present invention.
Figure 17:
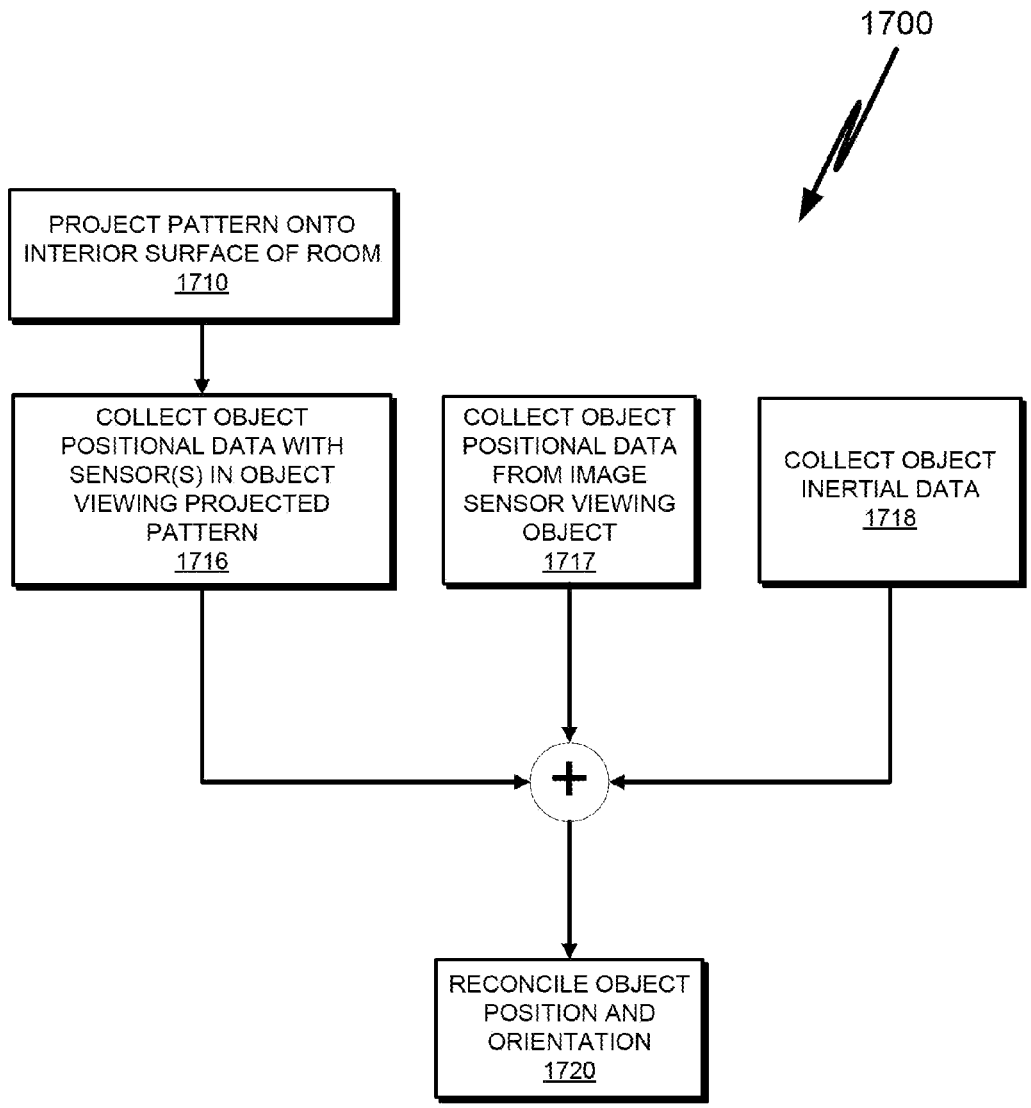
FIG. 17 is a flow diagram illustrating a method of determining object positional data based on a projected pattern, an object image, and inertial data, in accordance with an embodiment of the present invention.

FIG. 16 is a functional block diagram of modules of the object tracking system 100 which are to perform the hybrid method 1700 illustrated in FIG. 17 for determining object positional data based on at least two of: a projected pattern positional data, object image data, and object inertial data, in accordance with an embodiment. As shown in FIG. 16, the object 110 further includes at least one inertial sensor 1640. The inertial sensor 1640 is to measure accelerations along a single axis or multiple axes, and may measure linear as well as angular accelerations. Each of the inertial sensor 1640 and the PSD 131 are communicatively coupled to position engines 1660 and 1665, respectively. In further embodiments, PSD 111, affixed to the imaging device 105, is coupled to a third position engine 1670. As shown in FIG. 17, with a pattern projected on an interior room surface at operation 1710, the PSD 121 collects pattern positional data at operation 1716. Concurrently, at operation 1717 the PSD 111 (e.g., standard video camera) images the object 110 while the inertial sensor 1640 collects object inertial data at operation 1718.

Separate positional data of the object 110 is then generated by the engines 1660, 1665 and 1670 (FIG. 16) from the inertial data, projected pattern data, and, object image data, respectively. The various positional data components as derived from the separate pickups are then reconciled by the reconciling logic 1675 to output the object positional data at operation 1720. Position engines 1660 and 1675 may for example both output yaw of the object 110 while position engines 1665 and 16675 may both output X, Y, and Z positional data components. Each engine 1660, 1665, and 1670 may be software modules executed by a same processor in the computing device 115, for example, or each engine may be implemented in separate logic circuitry. The reconciling logic 1675, comprising a comb filter or other known signal processors/filters, is to then resolve a single set of components describing the object's position for output to a graphics engine in the exemplary embodiment.

Figure 18A:
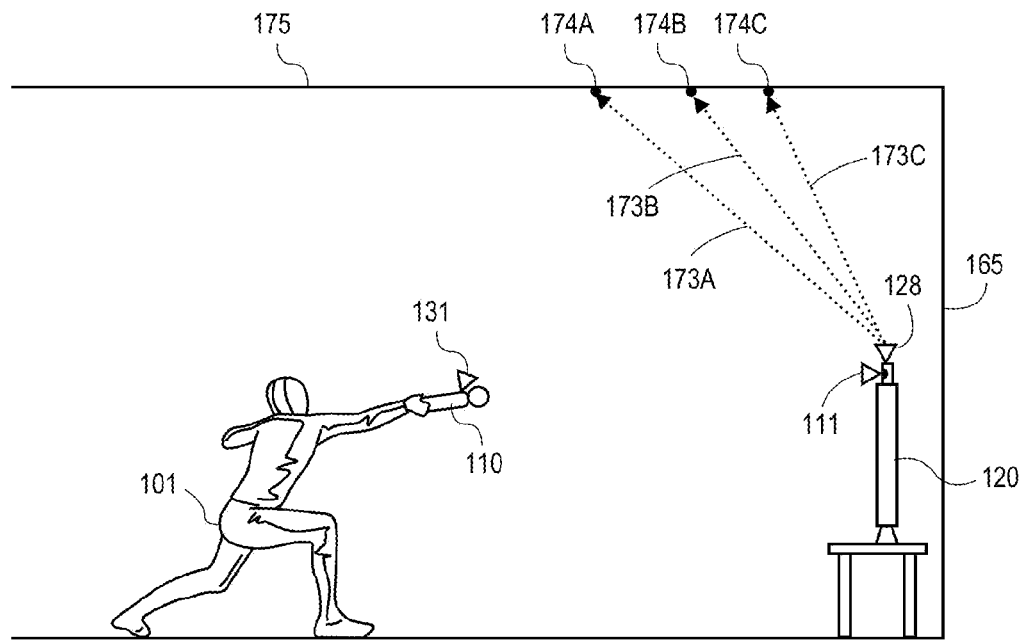
FIG. 18A is a side view a room in which an object tracking system utilizing positional information from a projected pattern and object image data is employed to control a graphical display, in accordance with one embodiment of the present invention.

Embodiments which determine object position from both PSD 131 and PSD 111 may advantageously simplify overall system design and improve tracking performance relative to alternate embodiments employing either the PSD 131 or PSD 111 alone. For example, where determination of X and Y components of position may be determined via PSD 111 with greater accuracy than is the Z component, a pattern may be projected and monitored by the PSD 131 to supplement determination of the Z component. As another example, FIG. 18A illustrates a side view of a room in which hybrid object tracking system determines object yaw from a projected pattern while at least one other component of object position is derived from image data. Object yaw for some applications is relatively unimportant and can be estimated with sufficient accuracy by the inertial sensor 1640 alone, for example. However, in other applications, yaw is the most important component of the object positional data (e.g., when the user 101 points the longitudinal axis of the object 110 toward a region of the display 120 during an aiming event). Thus, in particular embodiments, yaw may be determined from alternate data sources based on the orientation of the object 110. For example, yaw may be determined from the inertial sensor 1640 when pattern positional data is not available from the PSD 131 and yaw may be determined from the PSD 131 when pattern positional data is available.

Figure 18B:
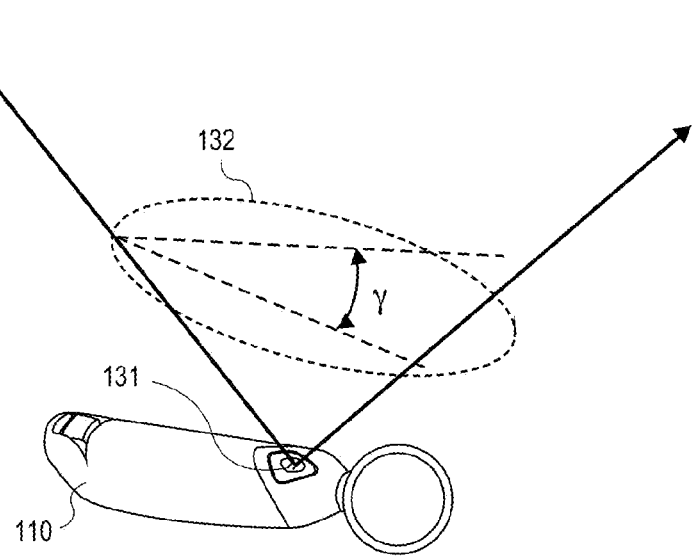
FIG. 18B is an isometric view of an object to be tracked in an object tracking system utilizing positional information from a projected pattern and object image data, according to one embodiment.

With the projector 128 casting beams 173A, 173B, and 173C onto the ceiling 175, yaw may be determined during an aiming event with a reduced number of PSDs 131 based on the expected object orientation during an aiming event. As shown in FIGS. 18A and 18B (an expanded isometric view of the object 110 depicted in FIG. 18A), a top-side PSD 131 having the FOV 132 will output a centroid of the ceiling beacons 174A, 174B and 174C from which the yaw angle γ may be determined during an aiming event.

Figure 19:
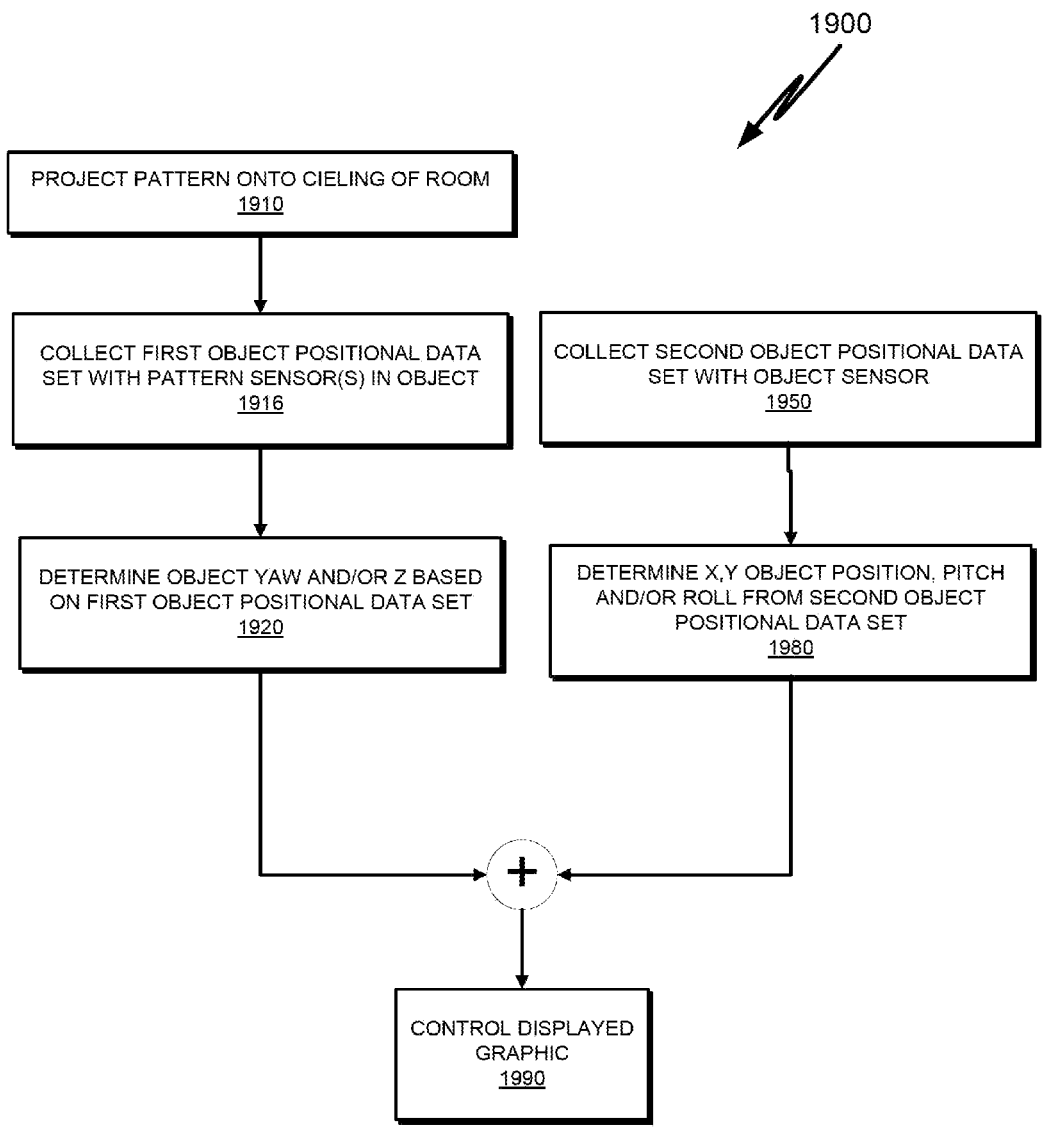
FIG. 19 is a flow diagram illustrating a method for determining separate components of an object position and orientation in an object tracking system utilizing positional information from a projected pattern and object image data, according to one embodiment.

FIG. 19 is a flow diagram illustrating a method 1900 in which a pattern projected onto a room ceiling at operation 1910 is viewed by pattern sensor(s) in the object 110. A first object positional data set is then determined at operation 1916. Concurrently, at operation 1950, a second object positional data set is generated from an object sensor external to the object, such as PSD 111 providing image data with a FOV containing the object 110. At operation 1920, at least object yaw and/or Z position is determined from the first object positional data set while at least X,Y components of object position are determined from the second object positional data set at operation 1980. These components are then combined and any redundant information reconciled. Finally at operation 1990, a displayed graphic is generated, modified, or otherwise controlled based on the tracked object position.

Figure 20:
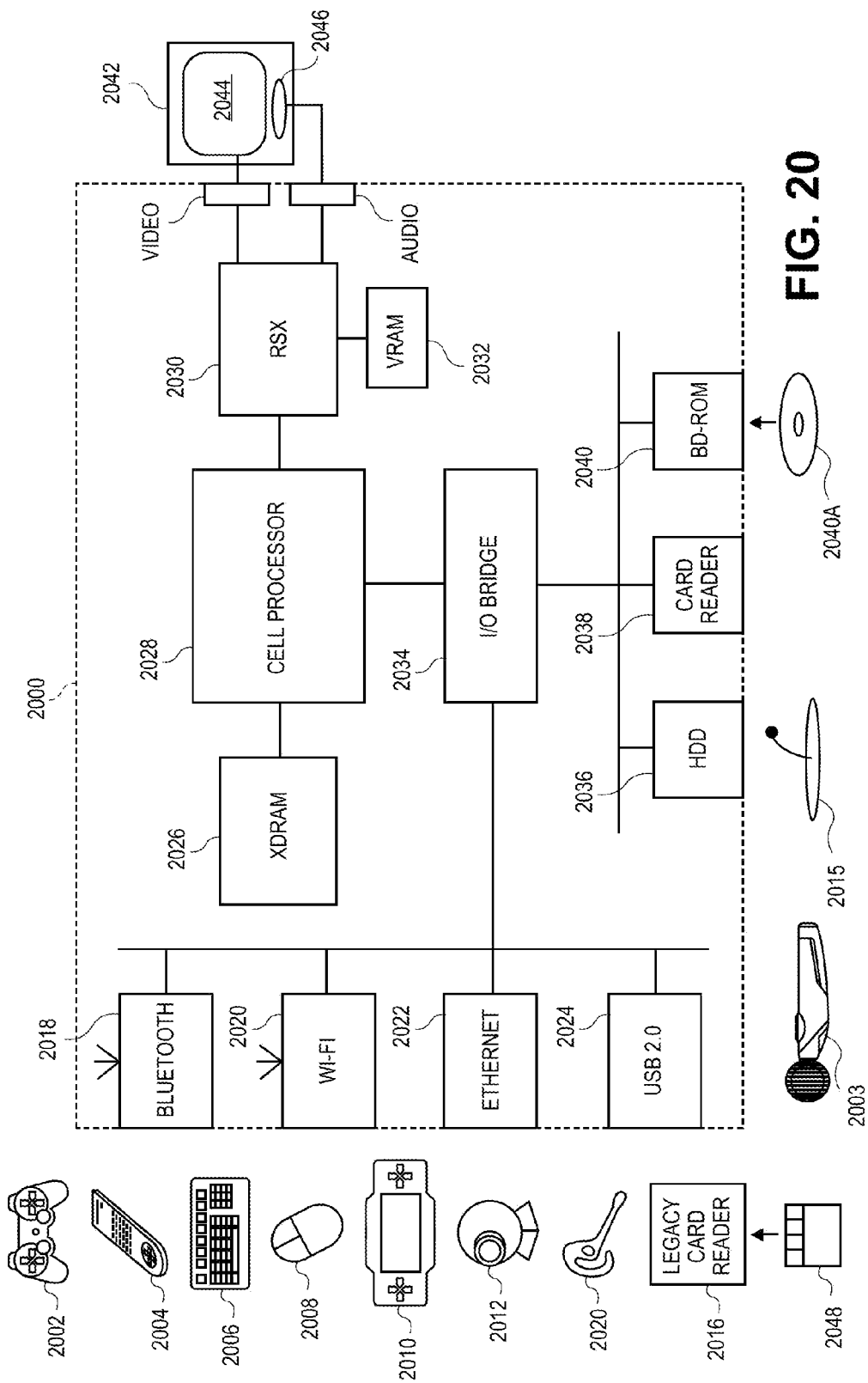
FIG. 20 illustrates hardware and user interfaces that may be used to determine object positional information, in accordance with one embodiment of the present invention.

FIG. 20 further illustrates hardware and user interfaces that may be used to adapt a display based on object tracking, in accordance with one embodiment of the present invention. FIG. 20 schematically illustrates the overall system architecture of the Sony® Playstation® 3 entertainment device, a console that may be compatible for implementing the object tracking methods described herein. A platform unit 2000 is provided, with various peripheral devices connectable to the platform unit 2000. The platform unit 2000 comprises: a Cell processor 2028; a Rambus® dynamic random access memory (XDRAM) unit 2026; a Reality Simulator graphics unit 2030 with a dedicated video random access memory (VRAM) unit 1432; and an I/O bridge 2034. The platform unit 2000 also comprises a Blu Ray® Disk BD-ROM® optical disk reader 2040 for reading from a disk 2040A and a removable slot-in hard disk drive (HDD) 2036, accessible through the I/O bridge 2034. Optionally the platform unit 1400 also comprises a memory card reader 2038 for reading compact flash memory cards, Memory Stick® memory cards and the like, which is similarly accessible through the I/O bridge 2034.

The I/O bridge 2034 also connects to multiple Universal Serial Bus (USB) 2.0 ports 2024; a gigabit Ethernet port 2022; an IEEE 802.11b/g wireless network (Wi-Fi) port 2020; and a Bluetooth® wireless link port 2018 capable of supporting of up to seven Bluetooth connections.

In operation, the I/O bridge 2034 handles all wireless, USB and Ethernet data, including data from one or more game controller 2002. For example when a user is playing a game, the I/O bridge 2034 receives data from the game (motion) controller 2002 via a Bluetooth link and directs it to the Cell processor 2028, which updates the current state of the game accordingly.

The wireless, USB and Ethernet ports also provide connectivity for other peripheral devices in addition to game controller 2002, such as: a remote control 2004; a keyboard 2006; a mouse 2008; a portable entertainment device 2010 such as a Sony Playstation® Portable entertainment device; a video image sensor such as an Playstation® Eye video image sensor 2012; a microphone headset 2020; a microphone array 2015. Such peripheral devices may therefore in principle be connected to the platform unit 2000 wirelessly; for example the portable entertainment device 2010 may communicate via a Wi-Fi ad-hoc connection, while the microphone headset 2020 may communicate via a Bluetooth link.

The provision of these interfaces means that the Playstation 3 device is also potentially compatible with other peripheral devices such as digital video recorders (DVRs), set-top boxes, digital video image sensors, portable media players, Voice over IP telephones, mobile telephones, printers and scanners.

The game controller 2002 is operable to communicate wirelessly with the platform unit 2000 via the Bluetooth link, or to be connected to a USB port, thereby also providing power by which to charge the battery of the game controller 2002. Game controller 2002 can also include memory, a processor, a memory card reader, permanent memory such as flash memory, light emitters such as LEDs or infrared lights, microphone and speaker, a digital video image sensor, a sectored photodiode, an internal clock, a recognizable/identifiable shape such as a spherical section facing the game console.

The game controller 2002 is configured for three-dimensional location determination, as described herein. Consequently gestures and movements by the user of the game controller 2002 may be translated as inputs to a game in addition to or instead of conventional button or joystick commands Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or the like.

The remote control 2004 is also operable to communicate wirelessly with the platform unit 2000 via a Bluetooth link. The remote control 2004 comprises controls suitable for the operation of the Blu Ray™ Disk BD-ROM reader 2040 and for the navigation of disk content.

The Blu Ray™ Disk BD-ROM reader 2040 is operable to read CD-ROMs compatible with the Playstation and PlayStation 2 devices, in addition to conventional pre-recorded and recordable CDs, and so-called Super Audio CDs. The reader 2040 is also operable to read DVD-ROMs compatible with the Playstation 2 and PlayStation 3 devices, in addition to conventional pre-recorded and recordable DVDs. The reader 2040 is further operable to read BD-ROMs compatible with the Playstation 3 device, as well as conventional pre-recorded and recordable Blu-Ray Disks.

The platform unit 2000 is operable to supply audio and video, either generated or decoded by the Playstation 3 device via the Reality Simulator graphics unit 2030, through audio and video connectors to a display and sound output device such as, the display 120. The audio connectors 2050 may include conventional analogue and digital outputs while the video connectors 2052 may variously include component video, S-video, composite video and one or more High Definition Multimedia Interface (HDMI) outputs. Consequently, video output may be in formats such as PAL or NTSC, or in 720p, 1080i or 1080p high definition.

In one embodiment, the video image sensor 2012 comprises a single charge coupled device (CCD) and an LED indicator. In some embodiments, the image sensor 2012 includes software and hardware-based real-time data compression and encoding apparatus so that compressed video data may be transmitted in an appropriate format such as an intra-image based MPEG (motion picture expert group) standard for decoding by the platform unit 2000. The video image sensor LED indicator is arranged to illuminate in response to appropriate control data from the platform unit 2000, for example to signify adverse lighting conditions. Embodiments of the video image sensor 2012 may variously connect to the platform unit 2000 via an HDMI, USB, Bluetooth or Wi-Fi communication port. Embodiments of the video image sensor may include one or more associated microphones and may also be capable of transmitting audio data. In embodiments of the video image sensor, the CCD may have a resolution suitable for high-definition video capture. In use, images captured by the video image sensor may for example be incorporated within a game or interpreted as game control inputs. In another embodiment the video image sensor is an infrared video image sensor suitable for detecting infrared light.

Figure 21:
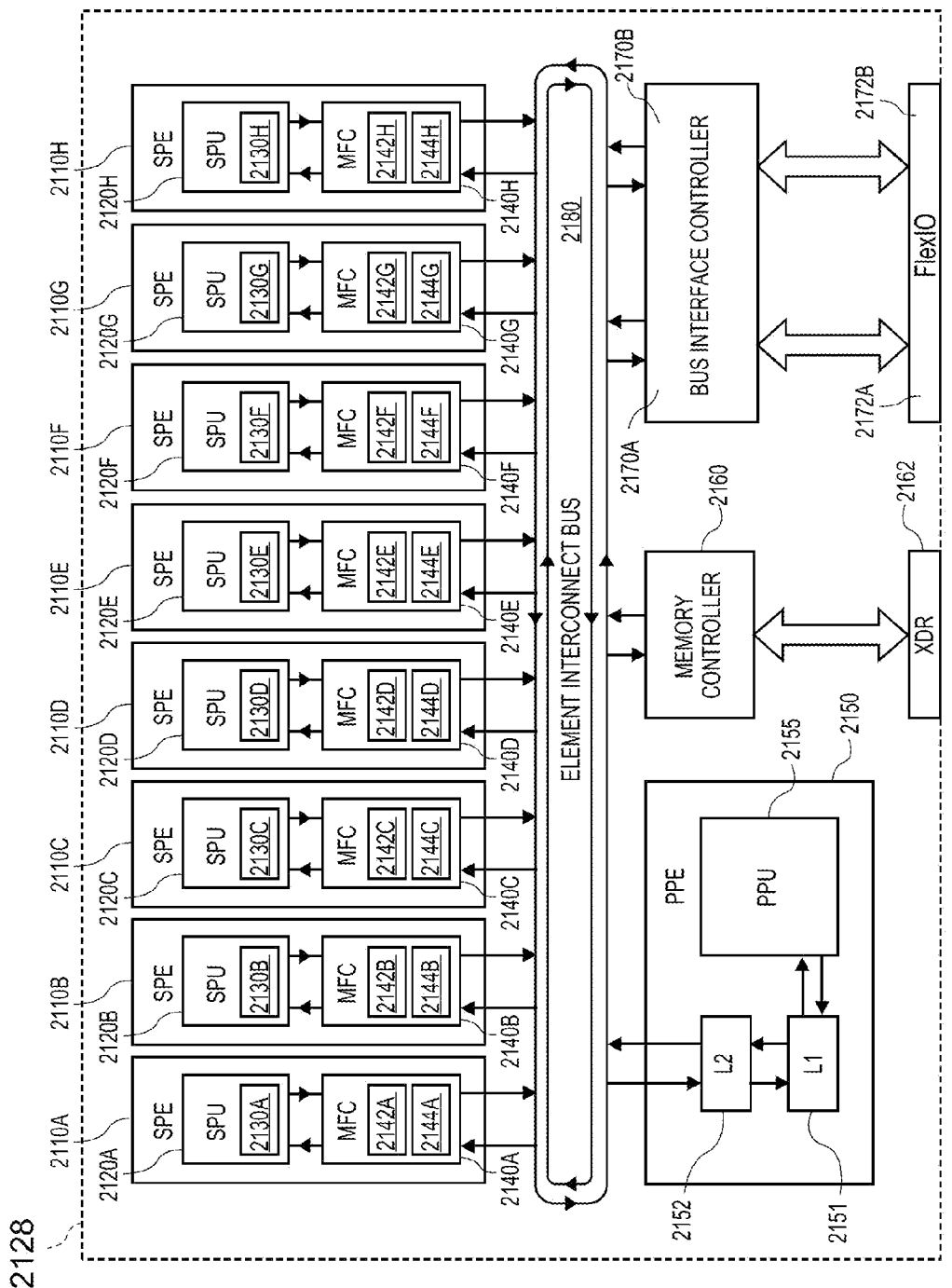
FIG. 21 illustrates additional hardware that may be used to process instructions, in accordance with one embodiment of the present invention.

FIG. 21 illustrates additional hardware that may be used to process instructions, in accordance with one embodiment of the present invention. Cell processor 2028 of FIG. 20, as further illustrated in FIG. 21, has an architecture comprising four basic components: external input and output structures comprising a memory controller 2160 and a dual bus interface controller 2170A, B; a main processor referred to as the Power Processing Element 2150; eight co-processors referred to as Synergistic Processing Elements (SPEs) 2110A-H; and a circular data bus connecting the above components referred to as the Element Interconnect Bus 2180.

The Power Processing Element (PPE) 2150 is based upon a two-way simultaneous multithreading Power 2070 compliant PowerPC core (PPU) 2155 running with an internal clock of 3.2 GHz. It comprises a 512 kB level 2 (L2) cache 2152 and a 32 kB level 1 (L1) cache 2151. The PPE 2150 is capable of eight single position operations per clock cycle, translating to 25.6 GFLOPs at 3.2 GHz. The primary role of the PPE 2150 is to act as a controller for the SPEs 2110A-H, which handle most of the computational workload. In operation the PPE 2150 maintains a job queue, scheduling jobs for the SPEs 2110A-H and monitoring their progress. Consequently each SPE 2110A-H runs a kernel whose role is to fetch a job, execute it and synchronized with the PPE 2150.

Each Synergistic Processing Element (SPE) 2110A-H comprises a respective Synergistic Processing Unit (SPU) 2120A-H, and a respective Memory Flow Controller (MFC) 2140A-H comprising in turn a respective Dynamic Memory Access Controller (DMAC) 2142A-H, a respective Memory Management Unit (MMU) 2144A-H and a bus interface (not shown). Each SPU 2120A-H is a RISC processor having local RAM 2130A-H.

The Element Interconnect Bus (EIB) 2180 is a logically circular communication bus internal to the Cell processor 2028 which connects the above processor elements, namely the PPE 2150, the memory controller 2160, the dual bus interface controller 1570A, B and the 8 SPEs 2110A-H, totaling 12 participants. Participants can simultaneously read and write to the bus at a rate of at least 8 bytes per clock cycle. As noted previously, each SPE 2110A-H comprises a DMAC 2142A-H for scheduling longer read or write sequences. The EIB comprises four channels, two each in clockwise and anti-clockwise directions. Consequently for twelve participants, the longest step-wise data-flow between any two participants is six steps in the appropriate direction.

The memory controller 2160 comprises an XDRAM interface 2126 through which the memory controller interfaces with XDRAM. The dual bus interface controller 2170A, B comprises a system interface 2172A,B.

It is to be understood that the above description is intended to be illustrative, and not restrictive. For example, while the flow diagrams in the figures show a particular order of operations performed by certain embodiments of the invention, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. The scope of the invention should, therefore, be determined with reference to the appended claims, along with the full scope of equivalents to which such claims are entitled.

What is claimed is:

1. A system for controlling a graphic on a display screen based on positional data determined for a tracked object, the system comprising:
   a projector to project a pattern of identifiable radiation onto at least one interior surface of a room in which the display screen is to be disposed, wherein the projector comprises a steerable laser having an emission spectrum comprising the near IR band, wherein the pattern of identifiable radiation comprises a plurality of beacons sequentially projected to mapped locations on the at least one interior surface;
   a first optical position sensing device disposed in the object to collect the identifiable radiation as reflected from the at least one interior surface, wherein the first optical position sensing device comprises a photodiode to determine a centroid of the reflected radiation;
a processor to determine positional data for the object based on the reflected radiation collected by the first optical position sensing device, and determine the plurality of mapped beacon locations, cause the projector to steer the projected radiation for one or more of the plurality of beacons from a first location on the interior surface to a second location on the interior surface, analyze the positional data to compare the distance between the projector and the first location with the distance between the projector and the second location, and select one of the first and second locations as one of the plurality of mapped beacon locations; and
a graphics engine to render the graphic based on the object positional data.

2. The system of claim 1, wherein the at least one interior surface includes the room ceiling.

3. The system of claim 1, wherein the at least one interior surface includes the room ceiling, wherein the projector comprises a fixed projection beam comprising the near IR band, the pattern comprises a plurality of interconnected repeating units, and wherein the first optical position sensing device comprises a video camera to collect images of the projected pattern.

4. The system of claim 1, further comprising a non-projected beacon emitting radiation at a known location relative to the projected pattern, and wherein the first optical position sensing device is to further determine beacon positional data from radiation emitted from the non-projected beacon.

5. The system of claim 1, wherein the processor is to analyze the positional data by comparing the intensity of the reflected radiation for the first and second locations.

6. The system of claim 1, wherein the processor is to analyze the positional data to evaluate movement of a centroid of an intensity distribution associated with one or more of the plurality of beacon locations as a function of steering angles corresponding to the first location and the second location.

7. The system of claim 1, wherein the processor is to analyze the positional data by comparing the change in distance between the projector and first and second locations with a change in projection direction cause by the beam steering.

8. The system of claim 1, wherein the processor is to analyze the positional data to maximize the number in the plurality of beacons mapped to location which lie on a same plane.

9. The system of claim 1, wherein the processor is to analyze the positional data by executing an algorithm to maximize uniformity in the beacon spacing.

10. The system of claim 1, wherein the processor is communicatively coupled to the first optical position sensing device, and wherein the processor is to receive from the first optical position sensing device a separate centroid of an intensity distribution associated with one or more of the plurality of beacon locations when the one or more of the plurality of beacons are at the first location and at the second location.

11. The system of claim 1, further comprising a second optical position sensing device disposed in known fixed position and orientation relative to the beacon projector and communicatively coupled to the processor, and wherein the processor is to receive the positional data associated with the first and second locations from the second optical position sensing device.

12. The system of claim 11, wherein the second optical position sensing device is to determine a centroid of an intensity distribution associated with one or more of the plurality of beacon locations when the one or more of the plurality of beacons are steered from the first location and the second location.

13. The system of claim 1, further comprising:
a video camera to image the object concurrently with the pattern projection; and
a processor to reconcile object positional data derived from image data generated by the video camera with object positional data derived from the projected pattern.

14. The system of claim 13, wherein the first optical position sensing device is disposed in a top side of the object, and wherein the processor is to determine yaw of the object based solely on object positional data derived from the projected pattern.

15. The system of claim 14, wherein the processor is to determine an x and y position of the object based at least in part on object positional data derived from image data generated by the video camera and is to determine a z position of the object based at least in part on object positional data derived from the projected pattern.

16. The system of claim 14, wherein the projector comprises a fixed IR projector, and wherein the first optical position sensing device comprises a second video camera to collect images of the projected pattern.

17. The system of claim 1, wherein the first optical position sensing device is one of a plurality of optical position sensing device embedded in the object, each of the plurality having know relative positions and orientations, and wherein the processor is to determine positional data for the object based on the reflected radiation collected by the plurality of optical position sensing devices.

18. A method of controlling a graphic on a display screen based on positional data determined for a tracked object, the method comprising:
projecting a pattern of identifiable radiation onto at least one interior surface of a room in which the display screen is to be disposed, wherein projecting the pattern of identifiable radiation comprises sequentially projecting a plurality of beacons to mapped locations on the at least one interior surface using at least one laser having an emission spectrum comprising the IR band, wherein the plurality of beacons is determined by steering the projected radiation for one or more of the plurality of beacons from a first location on the interior surface to a second location on the interior surface, analyzing the positional data by comparing the distance between the projector and the first location with the distance between the projector and the second location, and selecting one of the first and second locations as one of the plurality of mapped beacon locations;
collecting the identifiable radiation as reflected from the at least one interior surface with a first optical position sensing device disposed in the object;
determining positional data for the object based on the reflected radiation collected by the first optical position sensing device; and
controlling rendition of the graphic based on the object positional data.

19. The method of claim 18, wherein the at least one interior surface includes the room ceiling.

20. The method of claim 18, further comprising activating an LED as a fixed beacon emitting radiation at a known location relative to the projected pattern, and wherein collecting the identifiable radiation further includes collecting the radiation emitted by the LED.

21. The system of claim 18, wherein the at least one interior surface includes the room ceiling, wherein projecting the pattern of identifiable radiation further comprises projecting a fixed pattern comprising a plurality of interconnected repeating units.

22. The system of claim 21, wherein the first optical position sensing device comprises a video camera to collect images of the projected pattern.

23. The method claim 18, wherein collecting the identifiable radiation further comprises determining a centroid of an intensity distribution associated with one or more of the plurality of beacon locations.

24. The method of claim 18, wherein the analyzing further comprises: comparing the intensity of the reflected radiation for the first and second locations.

25. The method of claim 18, wherein the analyzing further comprises evaluating movement of a centroid of an intensity distribution associated with one or more of the plurality of beacon locations when the one or more of the plurality of beacons are steered from the first location to the second location.

26. The method of claim 18, wherein the analyzing further comprises comparing the change in distance between the projector and the first and second locations with a change in projection direction caused by the beam steering.

27. The method of claim 18, wherein the selecting one of the first and second locations is to maximize the number in the plurality of beacons mapped to locations which lie on a same plane.

28. The method of claim 18, wherein the selecting one of the first and second locations is to maximize uniformity in the beacon spacing across the same plane.

29. The method of claim 18, further comprising generating a separate centroid of an intensity distribution associated with one or more of the plurality of beacon locations when the one or more of the plurality of beacons are at each of the first second locations.

30. The method of claim 29, wherein the separate centroids are provided by a second optical position sensing device disposed in known fixed position and orientation relative to the beacon projector.

31. The method of claim 18, further comprising:
determining positional data of the object from image data generated by a video camera having the object in the camera field of view; and
reconciling object positional data derived from the collected image data with object positional data derived from the projected pattern.

32. The method of claim 31, wherein reconciling the object positional data further comprises determining yaw of the object based solely on object positional data derived from the projected pattern.

33. The method of claim 32, wherein reconciling the object positional data further comprises an x and y position of the object based at least in part on object positional data derived from image data generated by the video camera and determining a z position of the object based on object positional data derived from the projected pattern.

34. A non-transitory computer readable storage medium including instructions that, when executed by a processing system, cause the processing system to perform the method of claim 18.

* * * * *